US010429989B2

(12) United States Patent
Itakura et al.

(10) Patent No.: US 10,429,989 B2
(45) Date of Patent: Oct. 1, 2019

(54) CONTROL DEVICE, CONTROL METHOD, AND COMPUTER READABLE STORAGE MEDIUM

(71) Applicant: FUJITSU LIMITED, Kawasaki-shi, Kanagawa (JP)

(72) Inventors: Kota Itakura, Kawasaki (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 15/481,660

(22) Filed: Apr. 7, 2017

(65) Prior Publication Data
US 2017/0293389 A1    Oct. 12, 2017

(30) Foreign Application Priority Data

Apr. 8, 2016  (JP) .................................. 2016-078350

(51) Int. Cl.
  *G06F 3/045*  (2006.01)
  *G06F 3/041*  (2006.01)
  (Continued)

(52) U.S. Cl.
  CPC .......... *G06F 3/0416* (2013.01); *G06F 1/1643* (2013.01); *G06F 3/044* (2013.01);
  (Continued)

(58) Field of Classification Search
  CPC .... G06F 3/0416; G06F 3/0412; G06F 3/0488; G06F 3/04886; G06F 3/044; G06F 3/045; G06F 2203/04104
  See application file for complete search history.

(56) References Cited

U.S. PATENT DOCUMENTS 7,920,129 B2 *  4/2011  Hotelling .............. G06F 3/0416
                                                    345/173
8,031,174 B2 * 10/2011  Hamblin ............... G06F 1/1626
                                                    345/158
(Continued)

FOREIGN PATENT DOCUMENTS

EP  2 228 707 A2   9/2010
JP  2013-218468 A  10/2013
JP  2015-056172 A   3/2015

OTHER PUBLICATIONS

Extended European Search Report dated Aug. 3, 2017 in Patent Application No. 17165315.7.
European Office Action dated May 2, 2019, issued in European Patent Application No. 17 165 315.7.

*Primary Examiner* — Vijay Shankar
(74) *Attorney, Agent, or Firm* — Xsensus LLP

(57) ABSTRACT

A control device including: a processor configured to: receive signals from a multiple display system and report touch operations on the multiple display system via a network to an information processing device, the multiple display system including a first display and a second display that are configured to display the screen image dividedly, and when the processor detects a first touch operation on the first display and a second touch operation on the second display successively and determines that a relation between an end of the first touch operation and a start of the second touch operation satisfies a specified condition, report another touch operation, whose start corresponds to a start of the first touch operation and whose end corresponds to an end of the second touch operation, on the multiple display system to the information processing device via the network.

6 Claims, 45 Drawing Sheets

(51) Int. Cl.
*G06F 9/451* (2018.01)
*G06F 1/16* (2006.01)
*G06F 3/044* (2006.01)
*G06F 3/0488* (2013.01)
*G06F 3/14* (2006.01)
*G09G 5/14* (2006.01)

(52) U.S. Cl.
CPC ............ *G06F 3/045* (2013.01); *G06F 3/0412* (2013.01); *G06F 3/04886* (2013.01); *G06F 3/1454* (2013.01); *G06F 9/452* (2018.02); *G09G 5/14* (2013.01); *G06F 2203/0383* (2013.01); *G06F 2203/04104* (2013.01); *G09G 2370/022* (2013.01); *G09G 2370/027* (2013.01)

(56) References Cited

U.S. PATENT DOCUMENTS

| | | | |
|---|---|---|---|
| 8,049,732 B2* | 11/2011 | Hotelling | G06F 3/044 178/18.01 |
| 8,539,384 B2* | 9/2013 | Hinckley | G06F 3/04883 715/863 |
| 8,823,656 B2* | 9/2014 | Simmons | G06F 1/1641 345/1.1 |
| 8,866,754 B2* | 10/2014 | Homma | G06F 3/0416 345/1.1 |
| 2010/0225601 A1 | 9/2010 | Homma et al. | |
| 2012/0050177 A1 | 3/2012 | Simmons | |
| 2012/0235924 A1 | 9/2012 | Hochmuth et al. | |
| 2014/0085219 A1 | 3/2014 | Cai et al. | |
| 2015/0077365 A1 | 3/2015 | Sasaki | |

* cited by examiner

FIG. 10

| APPLICATION ID | CLIENT TERMINAL ID | WINDOW ID | DISPLAY CONTROL DEVICE ID | DISPLAY CONTROL DEVICE ID | HTML FILE NAME | CSS FILE NAME |
|---|---|---|---|---|---|---|
| A1 | C1 | W1 | D1 | D2 | a.html | a.css |
| ... | ... | ... | ... | ... | ... | ... |

FIG. 11

| WINDOW ID | W1 | |
|---|---|---|
| WINDOW DATA | WINDOW POSITION (X COORDINATE, Y COORDINATE) | WINDOW SIZE (WIDTH,HEIGHT) |
| ENTIRE COORDINATE SYSTEM | (1000,500) | (2000,2000) |
| DISPLAY COORDINATE SYSTEM OF FIRST DISPLAY CONTROL DEVICE | (1000,500) | (2000,2000) |
| DISPLAY COORDINATE SYSTEM OF SECOND DISPLAY CONTROL DEVICE | (-1000,500) | (2000,2000) |

FIG. 13

| WINDOW ID | WINDOW POSITION (X COORDINATE, Y COORDINATE) | WINDOW SIZE (WIDTH, HEIGHT) |
|---|---|---|
| W1 | (1000,500) | (2000,2000) |
| ⋮ | ⋮ | ⋮ |

FIG. 14

| WINDOW ID | HTML FILE NAME | CSS FILE NAME |
|---|---|---|
| W1 | a.html | a.css |
| ⋮ | ⋮ | ⋮ |

FIG. 16

| VALID EVENT ID | MAIN DISPLAY CONTROL DEVICE ID | WINDOW ID | EVENT TYPE | WINDOW POSITION (X COORDINATE, Y COORDINATE) | TIME STAMP |
|---|---|---|---|---|---|
| E1 | D1 | W1 | TOUCH MOVEMENT | (X1,Y1) | T1 |
| ... | ... | ... | ... | ... | ... |

FIG. 22

| MAIN EVENT ID | SUB-EVENT ID |
|---|---|
| E1 | E6 |
| ⋮ | ⋮ |

CONTROL DEVICE, CONTROL METHOD, AND COMPUTER READABLE STORAGE MEDIUM

CROSS-REFERENCE TO RELATED APPLICATION

This application is based upon and claims the benefit of priority of the prior Japanese Patent Application No. 2016-078350, filed on Apr. 8, 2016, the entire contents of which are incorporated herein by reference.

FIELD

The embodiments discussed herein are related to an event control technique in a multiple display system.

BACKGROUND

A multiple display technique is known in which an image generated in a user terminal is displayed on a large screen using a plurality of display devices. For example, in a case where configuration information of an image is sent from a user terminal to a display device and the configuration information is developed and an image is generated on a display device side, processing load is reduced and also an amount of data to be transferred is suppressed in the user terminal.

Furthermore, when an operation for a display surface is received on the display device side and the image is updated in response to the operation, convenience is further enhanced.

However, for example, a group of events occurring by operations performed continuously, for example, dragging may not be fitted in a display surface of a single display device.

CITATION LIST

Patent literature

[PATENT LITERATURE 1] Japanese Laid-open Patent Publication No. 2013-218468
[PATENT LITERATURE 2] Japanese Laid-open Patent Publication No. 2015-56172.

SUMMARY

According to an aspect of the invention, a control device includes a memory, and a processor coupled to the memory and the processor configured to: receive signals from a multiple display system and report touch operations on the multiple display system via a network to an information processing device, the multiple display system including a first display and a second display that are configured to display the screen image dividedly, and when the processor detects a first touch operation on the first display and a second touch operation on the second display successively and determines that a relation between an end of the first touch operation and a start of the second touch operation satisfies a specified condition, report another touch operation, whose start corresponds to a start of the first touch operation and whose end corresponds to an end of the second touch operation, on the multiple display system to the information processing device via the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an exemplary application table;
FIG. 11 is a diagram illustrating an exemplary management table;
FIG. 13 is a diagram illustrating an exemplary window table;
FIG. 14 is a diagram illustrating an exemplary contents table;
FIG. 16 is a diagram illustrating an exemplary event table;
FIG. 22 is a diagram illustrating an exemplary association table.

DESCRIPTION OF EMBODIMENTS

In an aspect of the present disclosure, it is intended to handle operations extending over display surfaces of a plurality of display devices as a series of operations.

[Embodiment 1]

Figure 1:
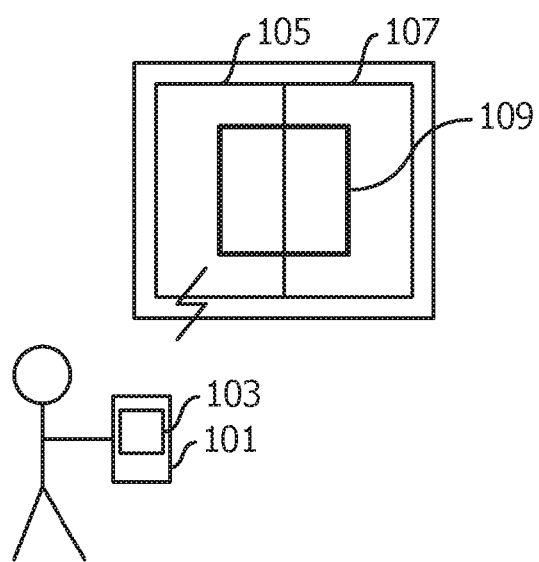
FIG. 1 is a diagram illustrating an outline of a multiple display system.

FIG. 1 illustrates an outline of a multiple display system according to the present embodiment. In this example, a content image 109 is displayed on the entire screen in which a display surface 105 of the left side and a display surface 107 of the right side are positioned side by side, based on content data 103 sent from a client terminal 101 held by a user. In this example, although an example in which the display surfaces are aligned horizontally, display surfaces may be aligned vertically. The display surfaces may also be aligned in a matrix shape.

Figure 2:
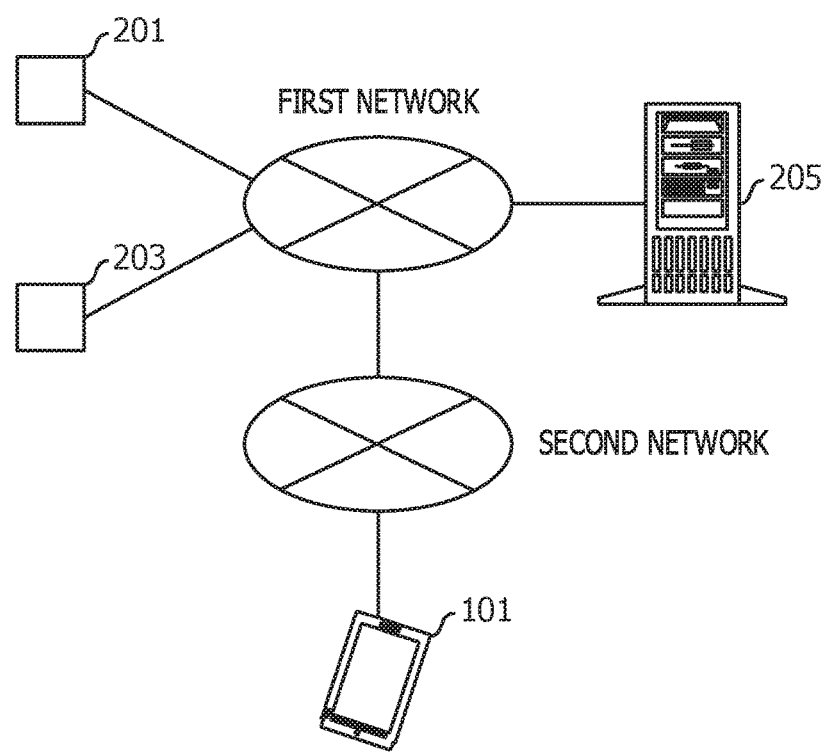
FIG. 2 is a diagram illustrating an exemplary network configuration.

FIG. 2 illustrates an exemplary network configuration. A first display control device 201 includes a display device providing a display surface 105 of the left side illustrated in FIG. 1. A second display control device 203 includes a display device providing a display surface 107 of the right side illustrated in FIG. 1. A server device 205 acts between the client terminal 101 and respective display control devices (in this example, first display control device 201 and second display control device 203) and mainly manages data relating to a window frame in each display control device.

The display device is, for example, a liquid crystal display, a plasma display, or a projector. In a case of the liquid crystal display and the plasma display, a display screen of a device is the display surface. In a case of the projector, a screen onto which an image is projected is the display surface.

The first display control device 201 and the second display control device 203 are connected to the server device 205 through a first network. The first network is, for example, a local area network (LAN). The first display control device 201 and the second display control device 203 are connected to the first network by a wired connection or wireless connection. The server device 205 is also connected to the first network by a wired connection or wireless connection.

The client terminal 101 is equipped with a function capable of connecting to the first network through a second network. In this example, the second network is the Internet and the client terminal 101 is equipped with a function of connecting to the Internet through a mobile communication network.

Figure 3:
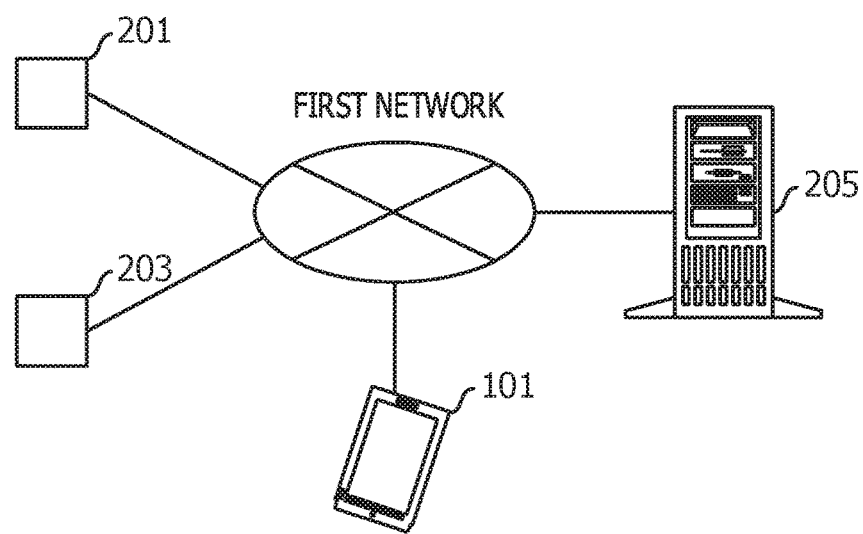
FIG. 3 is a diagram illustrating an exemplary network configuration.

FIG. 3 illustrates a diagram of another exemplary network configuration. The client terminal 101 may be directly connected to the first network. The client terminal 101 may be connected to the first network in a wired connection or may be connected to the first network in a wireless connection.

Figure 4:
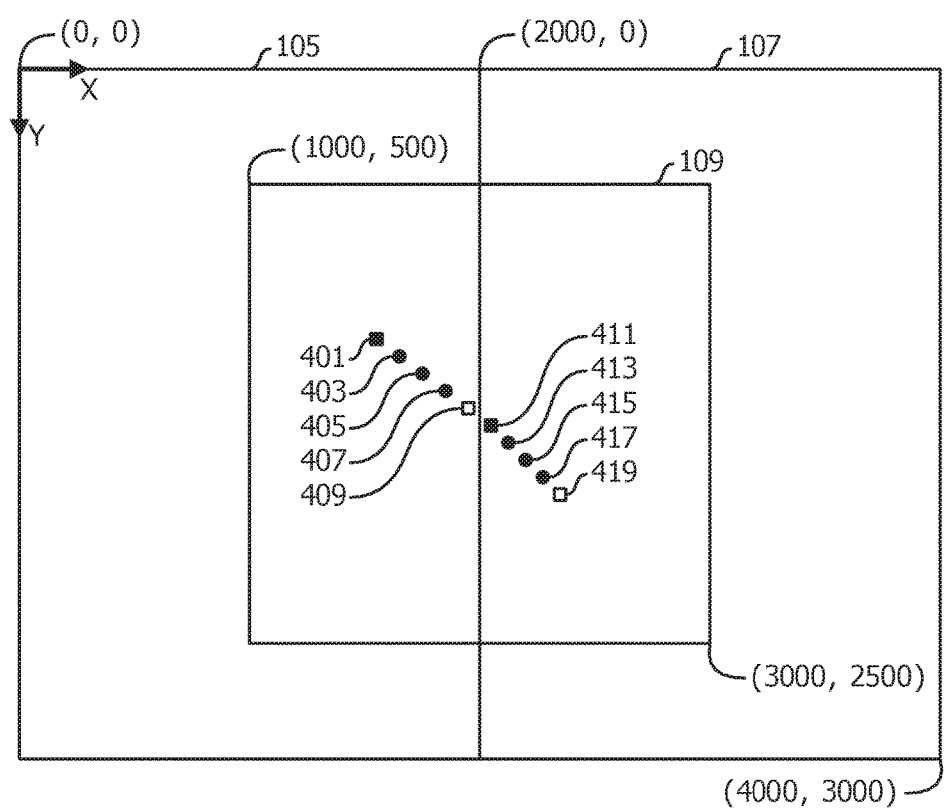
FIG. 4 is a diagram illustrating exemplary event occurrence positions.

An exemplary slide operation with touch is described. FIG. 4 illustrates event occurrence positions. When a slide operation is performed from a position 401 to a position 419, a touch start event first occurs at the position 401. Touch movement events sequentially occur at a position 403, a position 405, and a position 407. A touch end event occurs at a position 409 which corresponds to an end of the display surface 105.

Subsequently, a touch start event occurs at a position 411 which corresponds to an end of the display surface 107. Touch movement events sequentially occur at a position 413, a position 415, and a position 417. A touch end event occurs at a position 419.

In the present embodiment, when the touch start event occurs at the position 411 near the position 409 before a predetermined period of time elapses from a time point at which the touch end event has occurred at the position 409, an event ID of the event that has occurred in the display surface 105 side is associated with an event ID of the event that has occurred in the display surface 107 side. The event ID of the event that has occurred in the display surface 107 side is converted into the event ID of the event that has occurred in the display surface 105 side and delivers event data to the client terminal 101. In this way, a series of slide operations are recognized in the client terminal 101.

Figure 5:
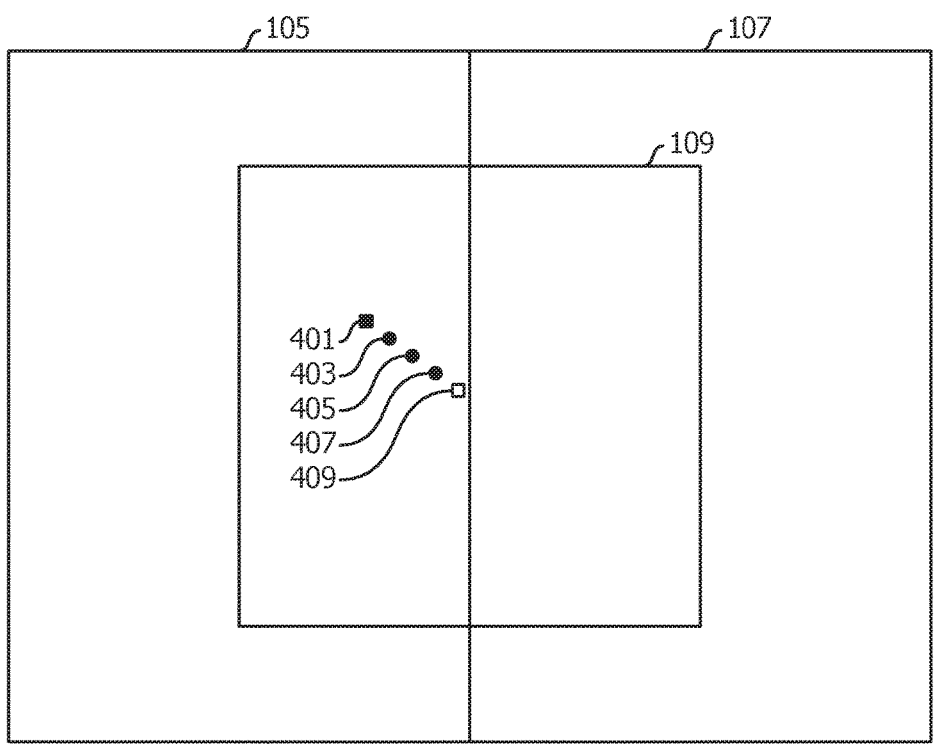
FIG. 5 is a diagram illustrating exemplary event occurrence positions.

FIG. 5 illustrates a pattern in which a touch end event occurs at the position 409 and thereafter no more event occurs. When a predetermined period of time elapses from a time point at which the touch end event has occurred at the position 409, the touch end event is delivered to the client terminal 101. A coordinate system is described later.

Figure 6:
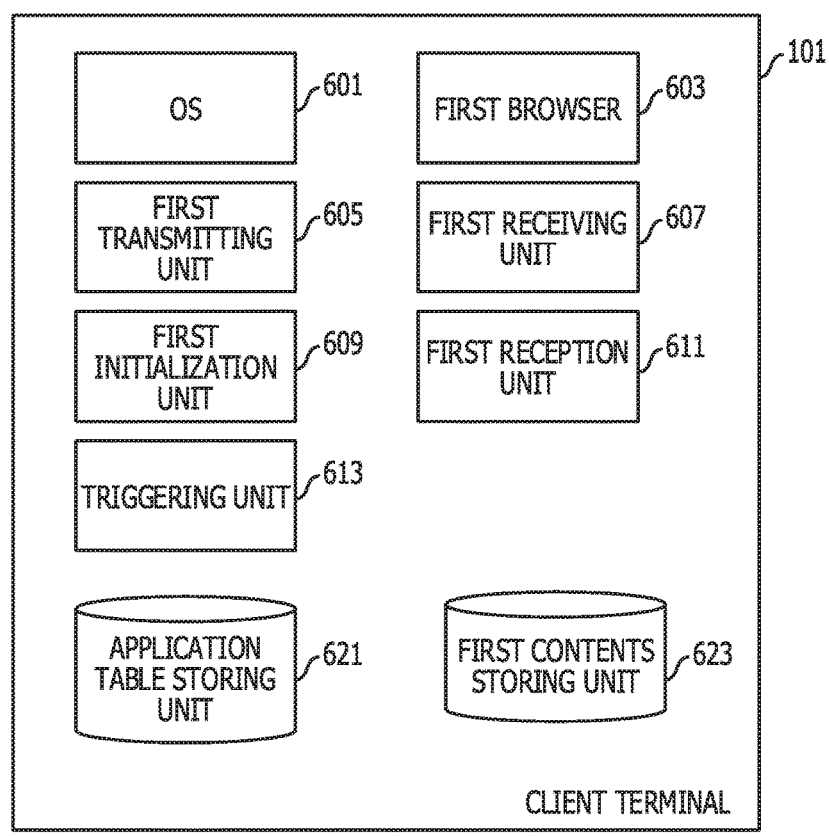
FIG. 6 is a diagram illustrating an exemplary modular configuration of a client terminal.

A modular configuration of each device is described. FIG. 6 illustrates an exemplary modular configuration of the client terminal 101. The client terminal 101 includes an operating system (OS) 601, a first browser 603, a first transmitting unit 605, a first receiving unit 607, a first initialization unit 609, a first reception unit 611, a triggering unit 613, an application table storing unit 621, and a first contents storing unit 623.

The OS 601 manages resources and a program of the client terminal 101. The first browser 603 performs browsing processing for content data 103. In this example, the content data 103 includes a Hyper Text Markup Language (HTML) file and a Cascading Style Sheets (CSS) file. The HTML file is an example of configuration definition information which includes display element data. The CSS file is an example of style definition information. A display element is, for example, a button.

The first transmitting unit 605 performs transmission of various data. The first receiving unit 607 performs reception of various data. The first initialization unit 609 performs initialization processing. The first reception unit 611 receives an instruction from a user. The triggering unit 613 triggers an event in the first browser 603. That is, the triggering unit 613 causes an event to occur in the first browser 603.

The application table storing unit 621 stores an application table (FIG. 10). The first contents storing unit 623 stores content data 103.

The first transmitting unit 605, the first receiving unit 607, the first initialization unit 609, the first reception unit 611, and the triggering unit 613 described above are realized by using hardware resources (for example, FIG. 44) and a program which causes a processor to execute processing to be described in the following.

Figure 44:
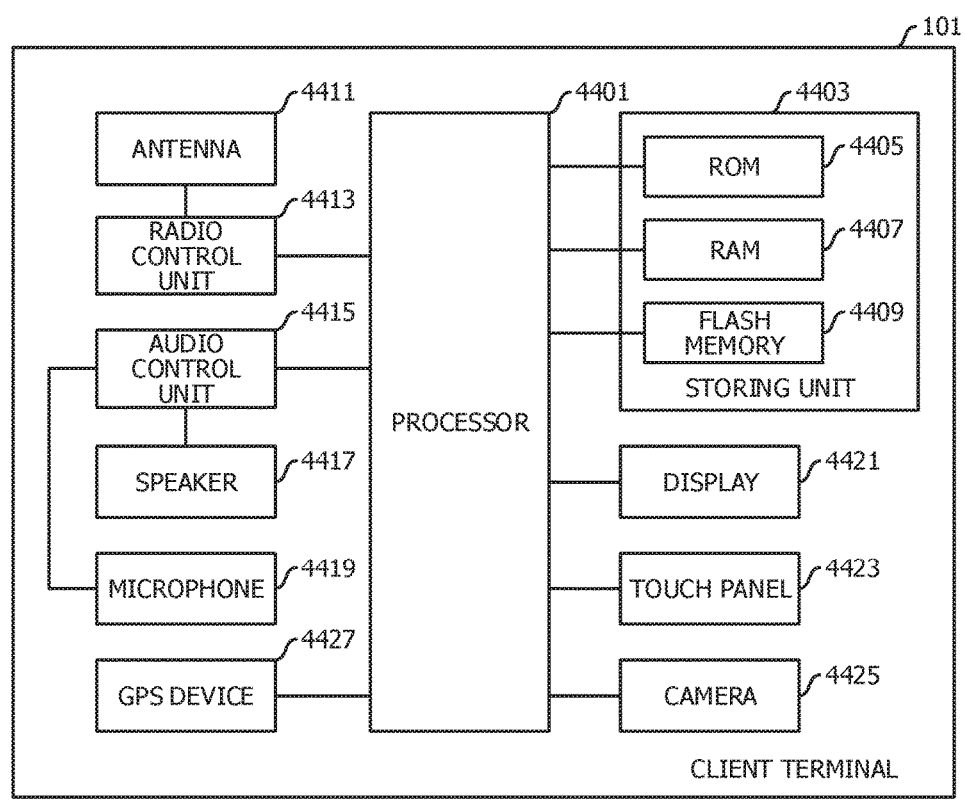
FIG. 44 is a diagram illustrating an exemplary hardware configuration of a client terminal.

The application table storing unit 621 and the first contents storing unit 623 described above are realized by using hardware resources (for example, FIG. 44).

Figure 7:
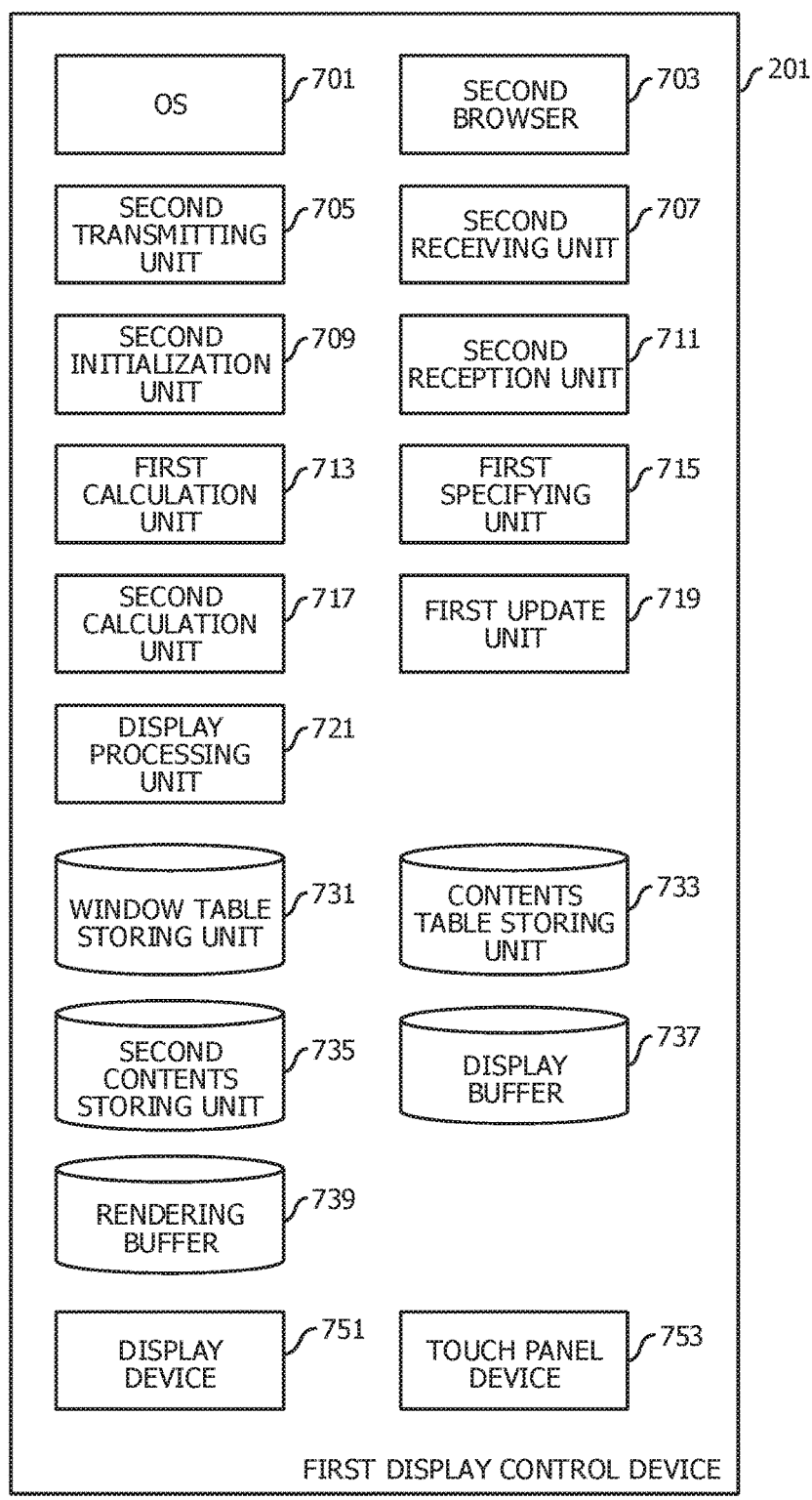
FIG. 7 is a diagram illustrating an exemplary modular configuration of a first display control device.

FIG. 7 illustrates an exemplary modular configuration of the first display control device 201. The first display control device 201 includes an OS 701, a second browser 703, a second transmitting unit 705, a second receiving unit 707, a second initialization unit 709, a second reception unit 711, a first calculation unit 713, a first specifying unit 715, a second calculation unit 717, a first update unit 719, a display processing unit 721, a window table storing unit 731, a contents table storing unit 733, a second contents storing unit 735, a display buffer 737, a rendering buffer 739, a display device 751, and a touch panel device 753.

The OS 701 includes a driver which controls a touch panel device 753. The second browser 703 performs browsing processing on content data 103. Specifically, the second browser 703 renders a content image 109 in the rendering buffer 739. The second transmitting unit 705 performs transmission of various data. The second receiving unit 707 performs reception of various data. The second initialization unit 709 performs initialization processing. The second reception unit 711 receives various events. The first calculation unit 713 calculates a position in the window at which an event has occurred. The first specifying unit 715 specifies a display element corresponding to a position at which an event has occurred. For example, a display element is specified by a path described by HTML. The second calculation unit 717 converts an event occurrence position of a window coordinate system into an event occurrence position of a display element coordinate system. The first update unit 719 updates an HTML file. The display processing unit 721 copies all or a part of the content image 109 rendered in the rendering buffer 739 to the display buffer 737 in accordance with window data. Furthermore, the display processing unit 721 causes the display device 751 to display the content image 109 copied to the display buffer 737.

The window table storing unit 731 stores a window table (FIG. 13). The contents table storing unit 733 stores a contents table (FIG. 14). The second contents storing unit 735 stores the content date 103. The display buffer 737 holds image data displayed on the display surface. The rendering buffer 739 is used for rendering the content image 109. The display device 751 is, for example, a liquid crystal display, a plasma display, or a projector. The touch panel device 753 is an example of a pointing device. The touch panel device 753 may be replaced by a touch pen device.

The second transmitting unit 705, the second receiving unit 707, the second initialization unit 709, the second reception unit 711, the first calculation unit 713, the first specifying unit 715, the second calculation unit 717, the first update unit 719, and the display processing unit 721 described above are realized by using hardware resources (for example, FIG. 45) and a program which causes a processor to execute processing to be described in the following.

Figure 45:
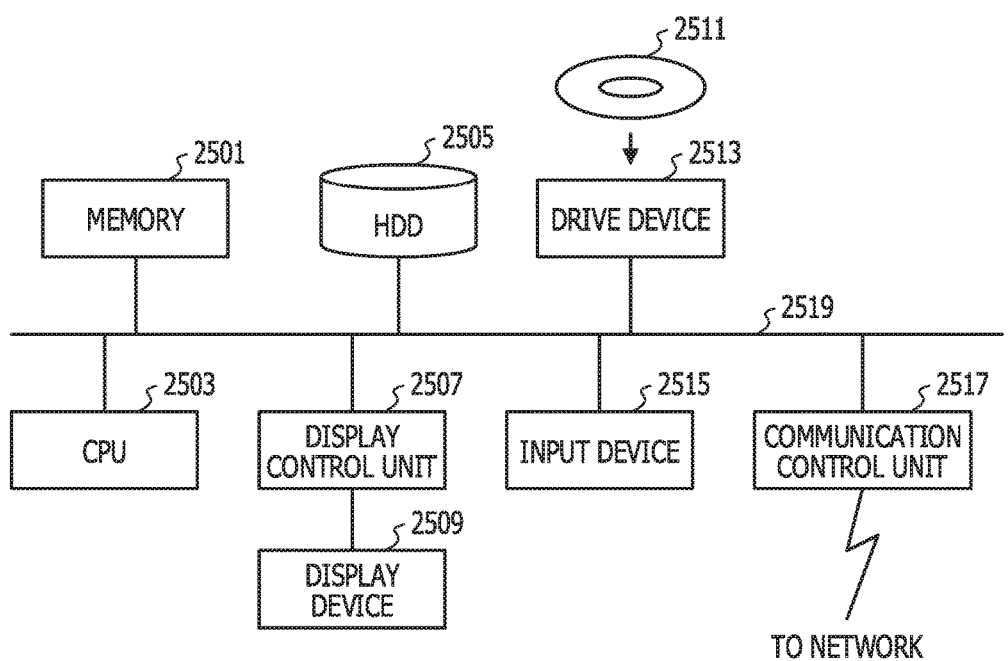
FIG. 45 is a functional block diagram of a computer.

The window table storing unit 731, the contents table storing unit 733, the second contents storing unit 735, the display buffer 737, and the rendering buffer 739 described above are realized by using hardware resources (for example, FIG. 45).

A modular configuration of the second display control device 203 is similar to the modular configuration of the first display control device 201.

Figure 8:
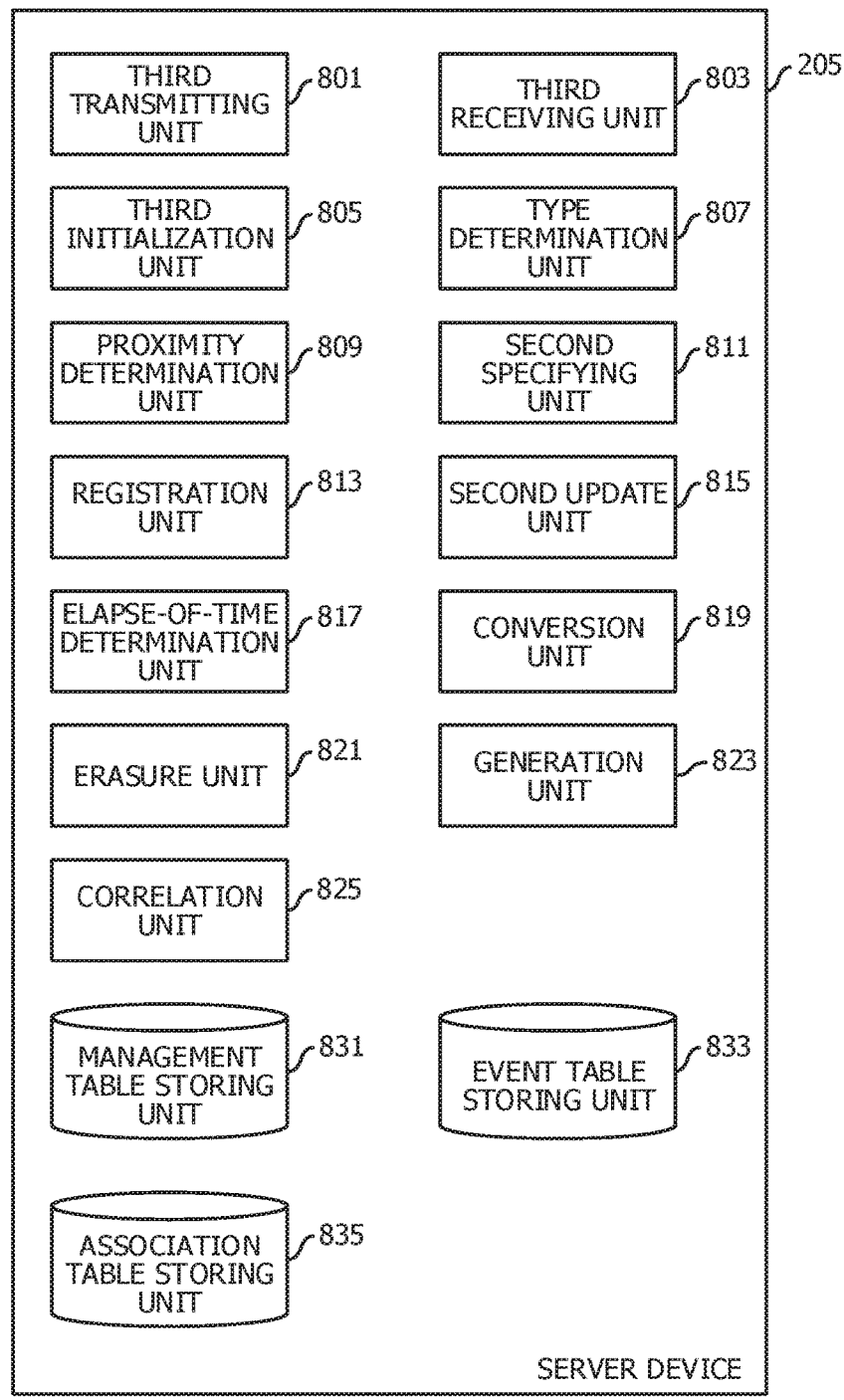
FIG. 8 is a diagram illustrating an exemplary modular configuration of a server device.

FIG. 8 illustrates an exemplary modular configuration of the server device 205. The server device 205 includes a third transmitting unit 801, a third receiving unit 803, a third initialization unit 805, a type determination unit 807, a proximity determination unit 809, a second specifying unit 811, a registration unit 813, a second update unit 815, an elapse-of-time determination unit 817, a conversion unit 819, an erasure unit 821, a generation unit 823, a correlation unit 825, a management fable storing unit 831, an event table storing unit 833, and an association table storing unit 835.

The third transmitting unit 801 performs transmission of various data. The third receiving unit 803 performs reception of various data. The third initialization unit 805 performs initialization processing. The type determination unit 807 performs a determination on an event type. The proximity determination unit 809 determines a positional relationship between event occurrence positions. The second specifying unit 811 specifies, for example, a main display control device ID. The main display control device ID specifies a device, which causes a main event ID to occur, among two display control devices. The registration unit 813 performs an addition of an event record. The second update unit 815 performs an update of the event record. The elapse-of-time determination unit 817 determines whether or not a predetermined period of time has elapsed from a time stamp of an event occurrence. The conversion unit 819 performs a conversion of an event ID. The erasure unit 821 performs an erasure of an unneeded record. The generation unit 823 performs generation of event data. The correlation unit 825 performs a correlation between event IDs.

Figure 22:
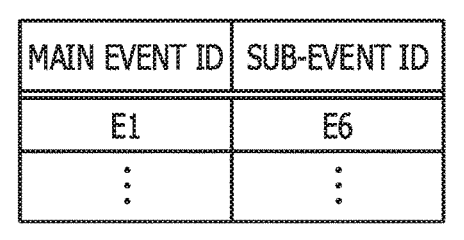

The management table storing unit 831 stores a management table (FIG. 11). The event table storing unit 833 stores an event table (FIG. 16). The association table storing unit 835 stores an association table (FIG. 22).

The third transmitting unit 801, the third receiving unit 803, the third initialization unit 805, the type determination unit 807, the proximity determination unit 809, the second specifying unit 811, the registration unit 813, the second update unit 815, the elapse-of-time determination unit 817, the conversion unit 819, the erasure unit 821, the generation unit 823, and the correlation unit 825 described above are realized by using hardware resources (for example, FIG. 45) and a program which causes a processor to execute processing to be described in the following.

The management table storing unit 831, the event table storing unit 833, and the association table storing unit 835 described above are realized by using hardware resources (for example, FIG. 45).

In the following, a sequence in a multiple display system is described. First, description is made on a sequence in a case where a window is generated on the entire screen in which the display surface 105 of the left side and the display surface 107 of the right side are aligned.

Figure 9:
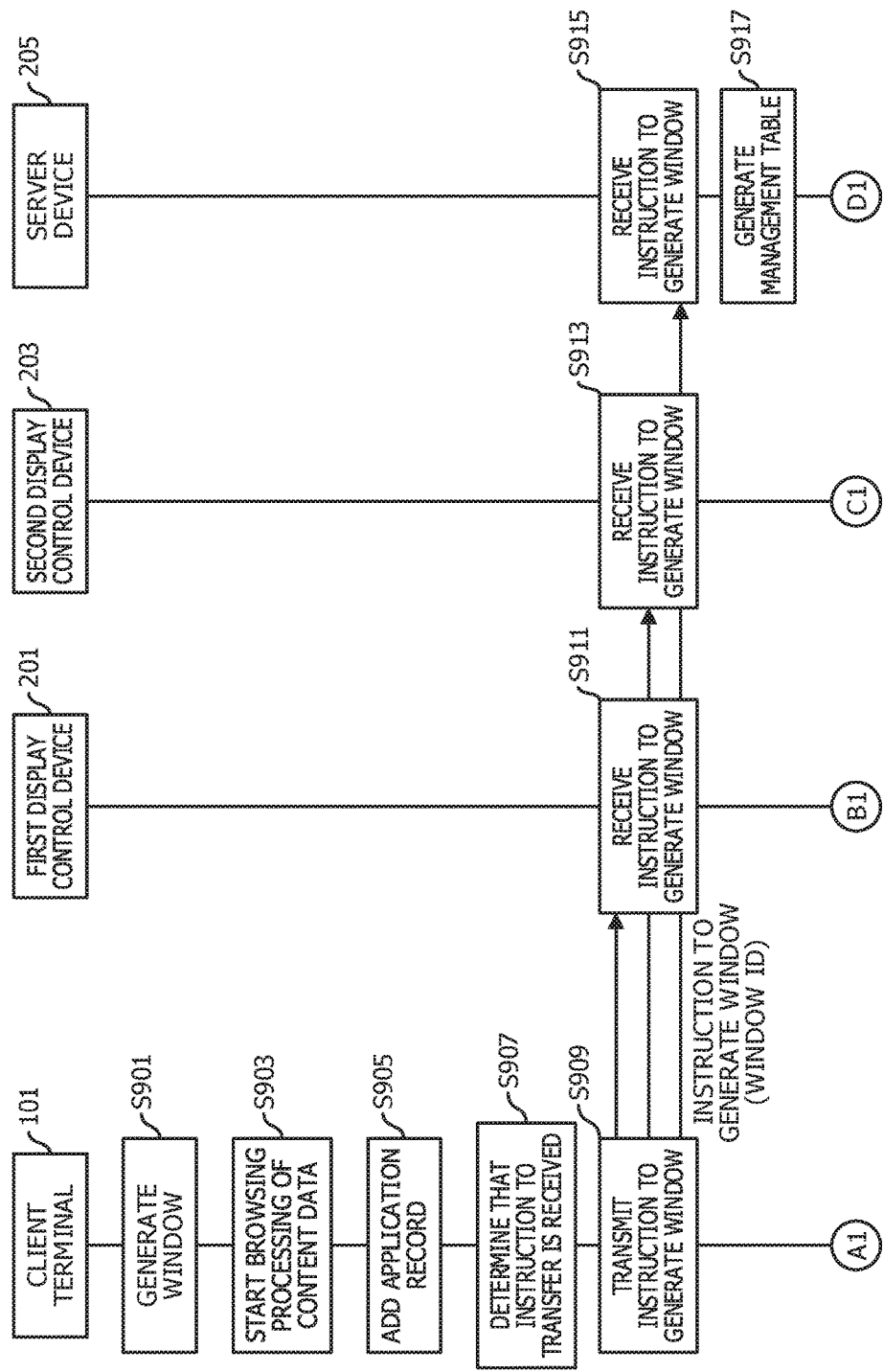
FIG. 9 is a diagram illustrating an exemplary sequence of an initial stage.

FIG. 9 illustrates an exemplary sequence of an initial stage. The first initialization unit 609 of the client terminal 101 causes the OS 601 of the client terminal 101 to generate a window (S901). The first initialization unit 609 of the client terminal 101 starts browsing processing for content data 103 by the first browser 603 of the client terminal 101 (S903). The first initialization unit 609 of the client terminal 101 adds an application record to an application table (S905). Furthermore, the first initialization unit 609 may be provided within the first browser 603.

FIG. 10 illustrates an exemplary application table. In this example, the application table includes a record (in the following, referred to as application record) corresponding to an application. The application may be one corresponding to the content data 103. The application record includes a field for setting an application ID, a field for setting a client terminal ID, a field for setting a window ID, a field for setting each display control device ID, a field for setting an HTML file name, and a field for setting a CSS file name. The client terminal ID is an ID of the client terminal 101. The window ID identifies a window in which a screen by browsing processing is displayed. The display control device ID identifies a device which controls the display device 751 displaying a portion of the window.

Description is made by referring back to FIG. 9. When it is determined that an instruction to transfer contents is received by the first reception unit 611 of the client terminal 101 (S907), the first transmitting unit 605 of the client terminal 101 transmits an instruction to generate a window to the first display control device 201, the second display control device 203, and the server device 205 (S909). The instruction to generate a window includes a window ID. The instruction may include a position of a window, a window size, data relating to a designation of a display control device, and the like.

The second receiving unit 707 of the first display control device 201 receives an instruction to generate a window (S911). The second receiving unit 707 of the second display control device 203 also receives the instruction to generate the window (S913).

The third receiving unit 803 of the server device 205 also receives the instruction to generate the window (S915). The third initialization unit 805 of the server device 205 generates a management table (S917).

FIG. 11 illustrates an exemplary management table. In this example, a window ID is held in a header portion of the management table. In this example, the management table includes records corresponding to respective coordinate systems. A record of window data includes a field for setting a position of a window and a field for setting a window size.

The position of the window is specified by the X coordinate and the Y coordinate which point a reference point of the window. In this example, a left upper end point of the window is the reference point. The window size is specified by a width and a height. Furthermore, other points (for example, center of gravity) in the window may be used as a reference point of a window.

In this example, window data of the entire coordinate system is set in a first record of the management table. Similarly, window data of a display coordinate system of the first display control device 201 is set in a second record of the management table. Similarly, window data of a display coordinate system of the second display control device 203 is set in a third record of the management table.

In this example, the first record of the management table indicates that a window identified by a window ID "W1" is set, by a size having a width of "2000" and a height of "2000", in a position (1000, 500) in the entire coordinate system. The second record of the management table indicates that the window identified by the window ID "W1" is set, by a size having a width of "2000" and a height of "2000", in a position (1000, 500) in the display coordinate system of the first display control device 201. The third record of the management table indicates that the window identified by the window ID "W1" is set, by a size having a width of "2000" and a height of "2000", in a position (−1000, 500) in the display coordinate system of the second display control device 203. In a case where a plurality of windows are generated, a plurality of management tables are provided.

Description is made on the position of the window in the entire coordinate system. In this example, a width of a window in which the content image 109 is displayed is 2000 (dots). Similarly, a height of the window is also 2000 (dots). A left upper end point corresponds to a position (1000, 500) in the entire coordinate system. That is, the position (1000, 500) is set as the reference point of the window in the entire coordinate system. A right lower end point corresponds to a position (3000, 2500) in the entire coordinate system.

Description is made on the position of the window in the display coordinate system of the first display control device 201. As described above, the display coordinate system of the first display control device 201 means a display coordinate system of the display surface 105 of the left side illustrated in FIG. 1. A width of the display surface 105 of the left side is 2000 (dots) and a height of the display surface 105 of the left side is 3000 (dots). A reference point (in this example, a left, upper end point of the window) of the window in which the content image 109 is displayed corresponds to a position (1000, 500) in the display coordinate system of the first display control device 201. A right lower end point of the window in which the content image 109 is displayed corresponds to a position (3000, 2500) in the display coordinate system of the first display control device 201.

Description is made on the position of the window in the display coordinate system of the second display control device 203. As described above, the display coordinate system of the second display control device 203 means a display coordinate system of the display surface 10 of the right side illustrated in FIG. 1. A width of the display surface 107 of the right side is 2000 (dots) and a height of the display surface 107 of the right side is 3000 (dots). A reference point (in this example, a left upper end point of the window) of the window in which the content image 109 is displayed corresponds to a position (−1000, 500) in the display coordinate system of the second display control device 203. A right lower end point of the window in which the content image 109 is displayed corresponds to a position (1000, 2500) in the display coordinate system of the second display control device 203.

Description is made by referring back to FIG. 9. The sequence of the initial stage proceeds from the sequence illustrated in FIG. 9 to a sequence illustrated in FIG. 12 through a connector symbol A1, a connector symbol B1, a connector symbol C1, and a connector symbol D1.

The third transmitting unit 801 of the server device 205 transmits window data of the first display control device 201 to the first display control device 201 (S1201). The window data includes a window position and a window size in the display coordinate system of the first display control device 201. The second initialization unit 709 of the first display control device 201 adds a window record to a window table and sets the window position and the window size included in the received window data in the window record (S1203).

FIG. 13 illustrates an exemplary window table. In this example, the window table includes a record (in the following, referred to as window record) corresponding to a window. The window record includes a field for setting a window ID and a field for setting a window position, and a field for setting a window size. The window ID identifies the window. The window position is a position of the window in a display coordinate system of the display control device.

Description is made by referring back to FIG. 12. The third transmitting unit 801 of the server device 205 transmits window data of the second display control device 203 (S1205). The window data includes a window position and a window size in the display coordinate system of the second display control device 203. The second initialization unit 709 of the second display control device 203 adds a window record to a window table and sets the window position and the window size included in the received window data in the window record (S1207).

On the oilier hand, the first transmitting unit 605 of the client terminal 101 transmits the CSS file and the HTML file which are the content data 103 to the first display control device 201 and the second display control device 203 (S1209).

When the HTML File and the CSS file are received, the second receiving unit 707 of the first display control device 201 sets an HTML file name and a CSS file name in a content record of a contents table and stores the HTML file and the CSS file in the second contents storing unit 735 of the first display control device 201 (S1211).

FIG. 14 illustrates an exemplary contents table. In this example, the contents table includes a record (in the following, referred to as content record) corresponding to the content data 103. The content record includes a field for setting a window ID, a field for setting an HTML file name, and a field for setting a CSS file name. The window ID identifies a window used for displaying the content.

Description is made by referring back to FIG. 12. The second initialization unit 709 of the first display control device 201 causes the OS 701 of the first display control device 201 to generate a window based on window data (S1213). The second initialization unit 709 of the first display control device 201 starts browsing processing for content data 103 by the first browser 703 of the first display control device 201 (S1215).

When the HTML file and the CSS file are received, the second receiving unit 707 of the second display control device 203 sets the HTML file name and the CSS file name in the content record of the contents table and stores the HTML file and the CSS file in the second contents storing unit 735 of the second display control device 203 (S1217).

The second initialization unit 709 of the second display control device 203 causes the OS 701 of the second display control device 203 to generate a window based on window data (S1219). The second initialization unit 709 of the second display control device 203 starts browsing processing for content data 103 by the second browser 703 of the second display control device 203 (S1221). The sequence proceeds to a sequence illustrated in FIG. 15 through a connector symbol B2 and a connector symbol D2.

Figure 15:
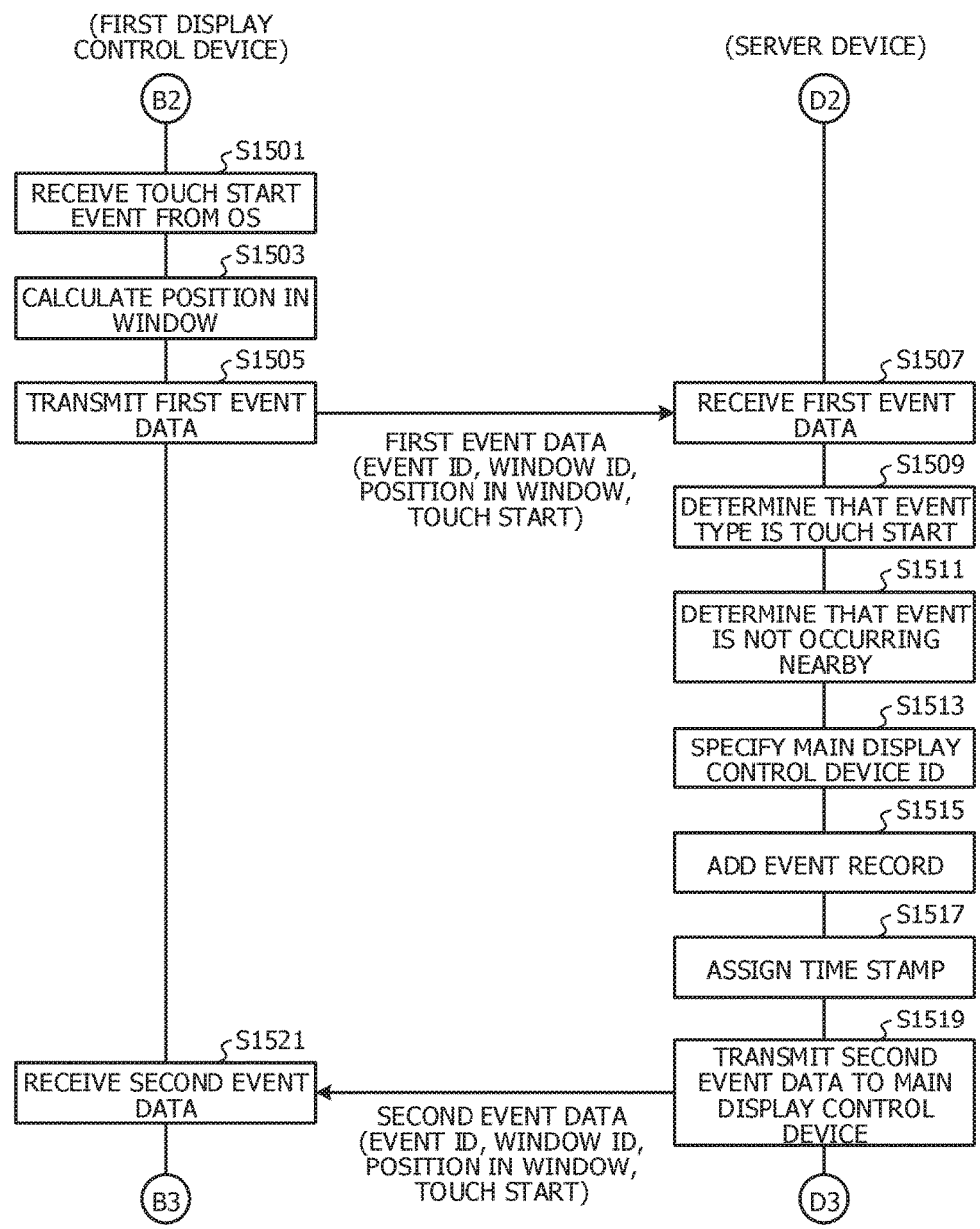
FIG. 15 is a diagram illustrating an exemplary touch start sequence.

On and after FIG. 15, description is made on a sequence in the pattern illustrated in FIG. 4. The second reception unit 711 of the first display control device 201 receives a touch start event from the OS 701 (S1501). The first calculation unit 713 of the first display control device 201 calculates a position in the window at which the touch start event has occurred (S1503). That is, the first calculation unit 713 converts a position in the entire coordinate system into a position of the window coordinate system based on the window data. The second transmitting unit 705 of the first display control device 201 transmits first event data to the server device 205 (S1505). The first event data includes an event ID, a window ID, a position in a window, and an event type (touch start).

Figure 21:
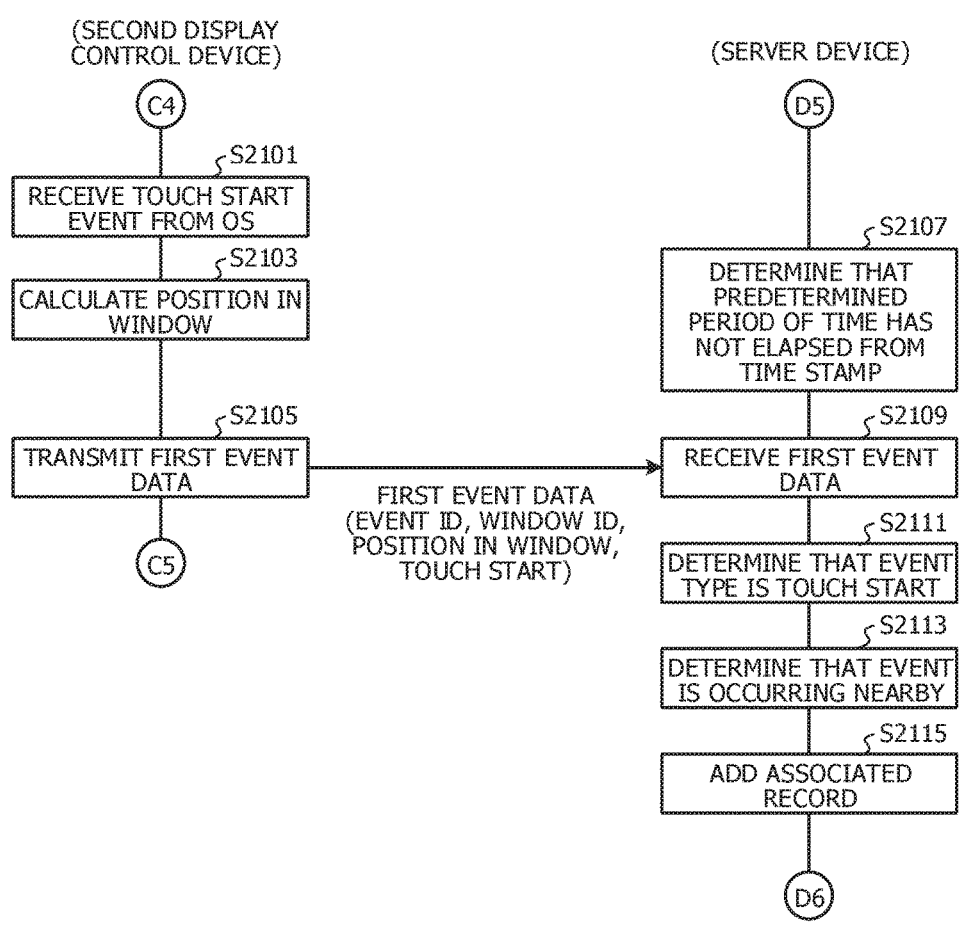
FIG. 21 is a diagram illustrating an exemplary touch start sequence.

When the third receiving unit 803 of the server device 205 receives the first event data (S1507), the type determination unit 807 of the server device 205 determines whether a type of the event is a touch start or not. When the type determination unit 807 of the server device 205 determines that the type of the event is the touch start (S1509), the proximity determination unit 809 of the server device 205 determines whether an event is occurring near the position of the first event or not. The determination processing is described in detail with reference to FIG. 21. Here, the proximity determination unit 809 of the server device 205 determines that an event is not occurring near the position of the first event (S1511).

In a case where an event is not occurring near the position of the first event, the second specifying unit 811 of the server device 205 specifies a main display control device ID (S1513). The main display control device ID identifies a display control device which administers a group of events starting from the touch start. Specifically, an ID of a display control device which is a transmission source for the first event data is specified.

The registration unit 813 of the server device 205 adds an event record (S1515). FIG. 16 illustrates an exemplary event table. In this example, the event table includes a record (in the following, referred to as event record) corresponding to a valid event. The event record includes a field for setting a valid event ID, a field for setting a main display control device ID, a field for setting a window ID, a field for setting an event type, a field for setting a position in a window, and a field for setting a time stamp. The valid event ID is an event ID included in the first event data received in S1507. The transmission source device of the first event data received in S1507 is identified by the main display control device ID. A window in which the event has occurred is identified by the window ID. The event type is a type of an event occurred latest. Specifically, any of a touch start, a touch movement, and a touch end is set. The position in a window is a position of the event occurred latest and uses the window coordinate system as a reference coordinate system. The time stamp specifies a time point of an event occurred latest.

Description is made by referring back to FIG. 15. The registration unit 813 of the server device 205 assigns a time stamp to an event record (S1517). The third transmitting unit 801 of the server device 205 transmits second event data to a main display control device (in this example, first display control device 201) (S1519). The second event data includes an event ID, a window ID, a position in a window, and an event type (touch start).

The second receiving unit 707 of the first display control device 201 receives the second event data (S1521). The sequence proceeds to a sequence illustrated in FIG. 17 through a connector symbol B3.

Figure 12:
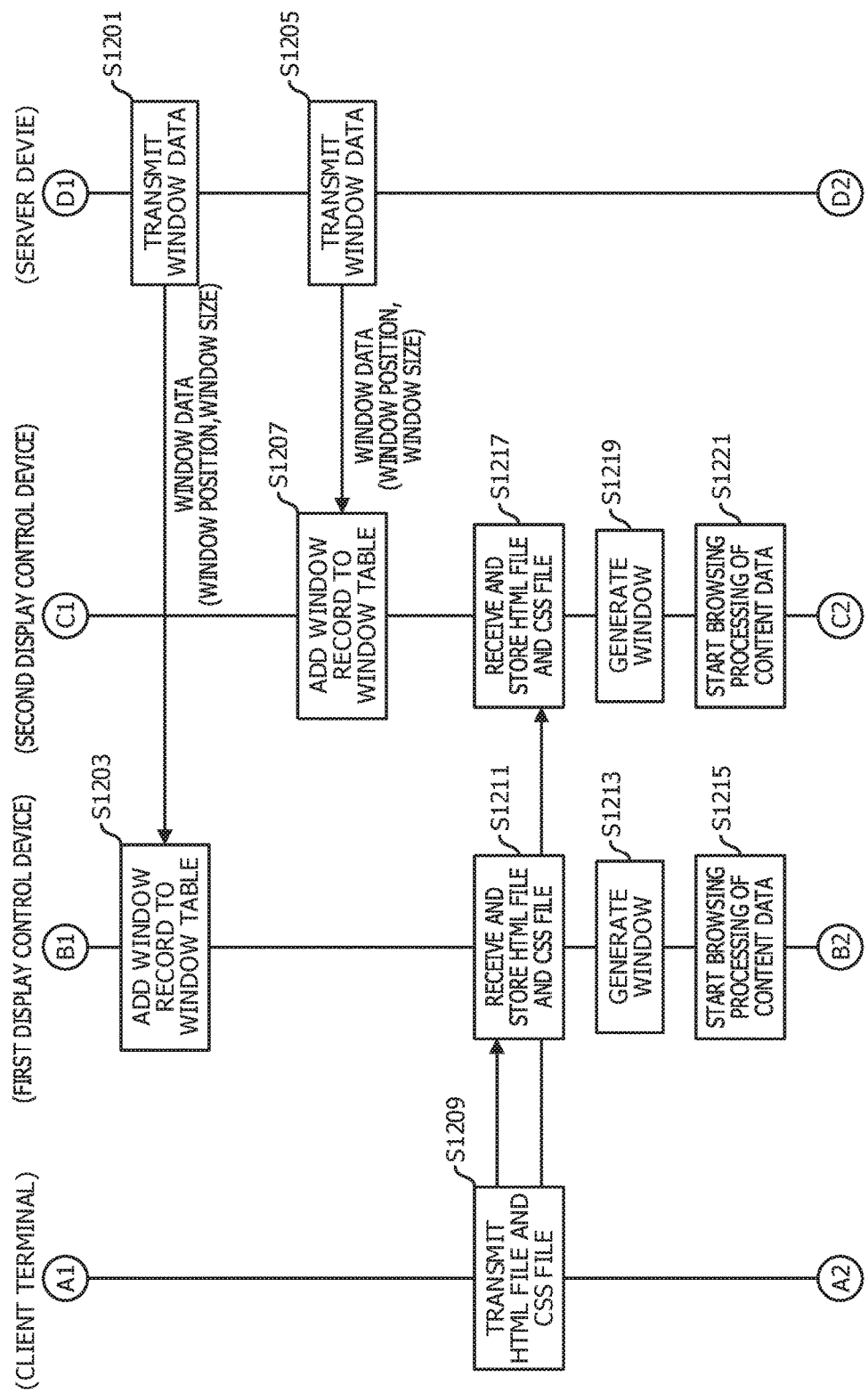
FIG. 12 is a diagram illustrating an exemplary sequence of an initial stage.

Processing of the client terminal 101 is continued from processing illustrated in FIG. 12 through a connector symbol A2. Processing of the second display control device 203 is continued from the processing illustrated in FIG. 12 through a connector symbol C2. The first specifying unit 715 of the first display control device 201 specifies a display element which includes a position at which an event has occurred (S1701). In this case, the first specifying unit 715 of the first display control device 201 inquires the second browser 703 of an area of a display element. The second calculation unit 717 of the first display control device 201 calculates a position in the display element based on the area of the display element (S1703). That is, the event occurrence position in the window coordinate system is converted info the event occurrence position in the display element coordinate system. The second transmitting unit 705 of the first display control device 201 transmits third event data to the client terminal 101 (S1705). The third event data includes an event ID, a window ID, a display element ID, a position in the display element, and an event type (touch start).

When the first receiving unit 607 of the client terminal 101 receives the third event data (S1707), the triggering unit 613 of the client terminal 101 triggers an event (S1709). By this processing, an event based on the third event data occurs in the second browser 703. Accordingly, the display element data included in the HTML file may be updated. The first transmitting unit 605 of the client terminal 101 transmits the HTML file (or updated display element data) to the first display control device 201 and the second display control device 203 (S1711).

When the second receiving unit 707 of the first display control device 201 receives the HTML file (or updated display element data) (S1713), the first update unit 719 of the first display control device 201 updates the HTML file and provides the HTML file to the browsing processing (S1715).

When the second receiving unit 707 of the second display control device 203 receives the HTML file (or updated display element data) (S1717), the first update unit 719 of the second display control device 203 updates the HTML file and provides the HTML file to the browsing processing (S1719). The sequence proceeds to a sequence illustrated in FIG. 18 through a connector symbol B4.

Processing of the server device 205 is continued from processing illustrated in FIG. 15 through a connector symbol D3. Subsequently, the second reception unit 711 of the first display control device 201 receives a touch movement event from the OS 701 (S1801). The first calculation unit 713 of the first display control device 201 calculates a position in the window at which the touch movement event has occurred (S1803). The second transmitting unit 705 of the first display control device 201 transmits first event data to the server device 205 (S1805). The first event data includes an event ID, a window ID, a position in a window, and an event type (touch movement).

When the third receiving unit 803 of the server device 205 receives the first event data (S1807), the type determination unit 807 of the server device 205 determines whether a type of the event is a touch movement. When the type determination unit 807 of the server device 205 determines that the type of the event is the touch movement (S1809), the second specifying unit 811 of the server device 205 determines whether an event record having the same event ID as an event ID included in the first event data is present or not. When it is determined that the event record having the same event ID is present (S1811), the second specifying unit 811 of the server device 205 specifies a main display control device ID included in the event record (S1813). Furthermore, the second update unit 815 of the server device 205 updates the event type, the position in the window, and the time stamp included in the event record (S1815). The third transmitting unit 801 of the server device 205 transmits second event data to a main display control device (in this example, first display control device 201) (S1817). The second event data includes an event ID, a window ID, a position in a window, and an event type (touch movement).

The second receiving unit 707 of the first display control device 201 receives the second event data (S1819). The sequence proceeds to a sequence illustrated in FIG. 19 through a connector symbol B5.

Figure 17:
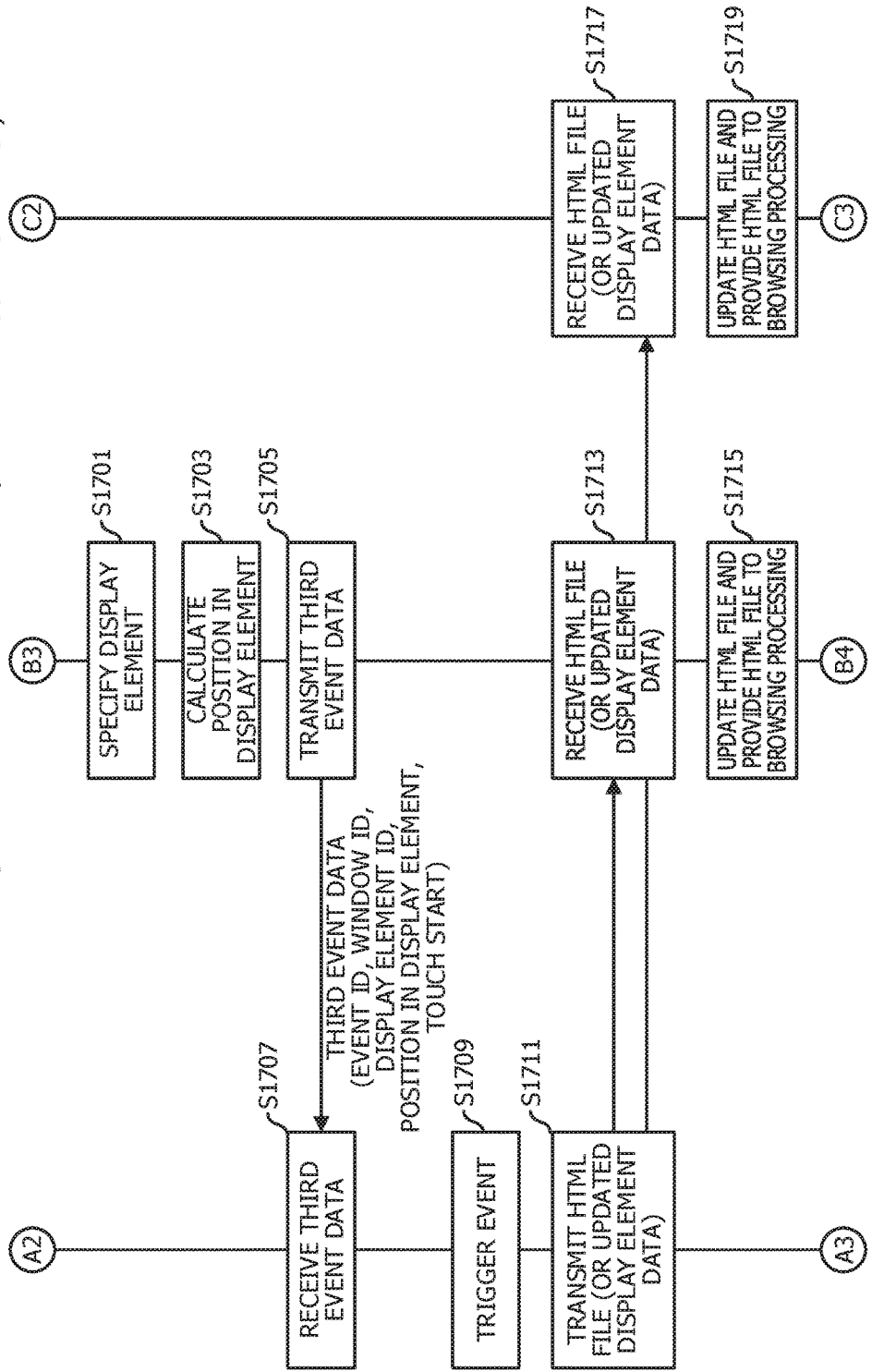
FIG. 17 is a diagram illustrating an exemplary touch start sequence.

Processing of the client terminal 101 is continued from processing illustrated in FIG. 17 through a connector symbol A3. Processing of the second display control device 203 is continued from processing illustrated in FIG. 17 through a connector symbol C3. In the sequence illustrated in FIG. 19, regarding a touch movement event, similar processing to those processing in a range of S1701 to S1719 of FIG. 17 is performed in a range of S1901 to S1919. Regarding subsequent touch movement events, a series of processing described above is repeated. The sequence proceeds to a sequence illustrated in FIG. 20 through a connector symbol B6.

Figure 18:
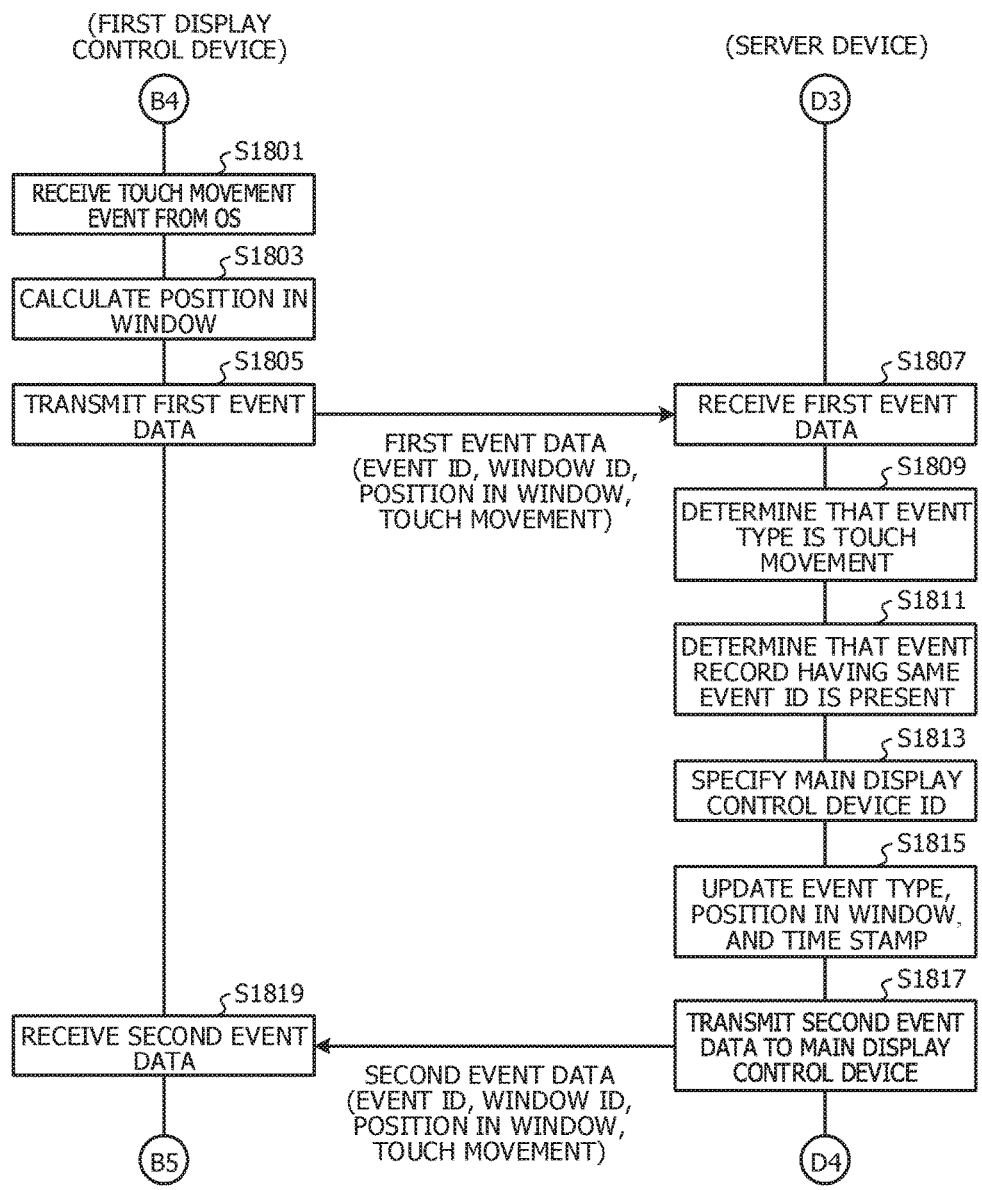
FIG. 18 is a diagram illustrating an exemplary touch movement sequence.

Processing of the server device 205 is continued from processing illustrated in FIG. 18 through a connector symbol D4. When the second reception unit 711 of the first display control device 201 receives a touch end event from the OS 701 (S2001), the first calculation unit 713 of the first display control device 201 calculates a position in the window at which the touch end event has occurred (S2003). The second transmitting unit 705 of the first display control device 201 transmits first event data to the server device 205 (S2005). The first event data includes an event ID, a window ID, a position in a window, and an event type (touch end).

When the third receiving unit 803 of the server device 205 receives the first event data (S2007), the type determination unit 807 of the server device 205 determines whether a type of the event is the touch end or not. In this example, the type determination unit 807 of the server device 205 determines that the type of the event is the touch end (S2009) and the second specifying unit 811 of the server device 205 determines that an event record having the same event ID as an event ID included in the first event data is present (S2011). The second update unit 815 of the server device 205 updates the event type, the position in the window, and the time stamp in the event record (S2013). Accordingly, processing regarding the touch end event is ended. However, the touch end event may be converted into the touch movement event.

Furthermore, the elapse-of-time determination unit 817 of the server device 205 repeats a determination as to whether a predetermined period of time has elapsed from a time stamp, for respective event records. In this stage, it is determined that a predetermined period of time has not elapsed from a time stamp of the event record (S2015). The sequence proceeds to a sequence illustrated in FIG. 21 through a connector symbol D5.

Figure 19:
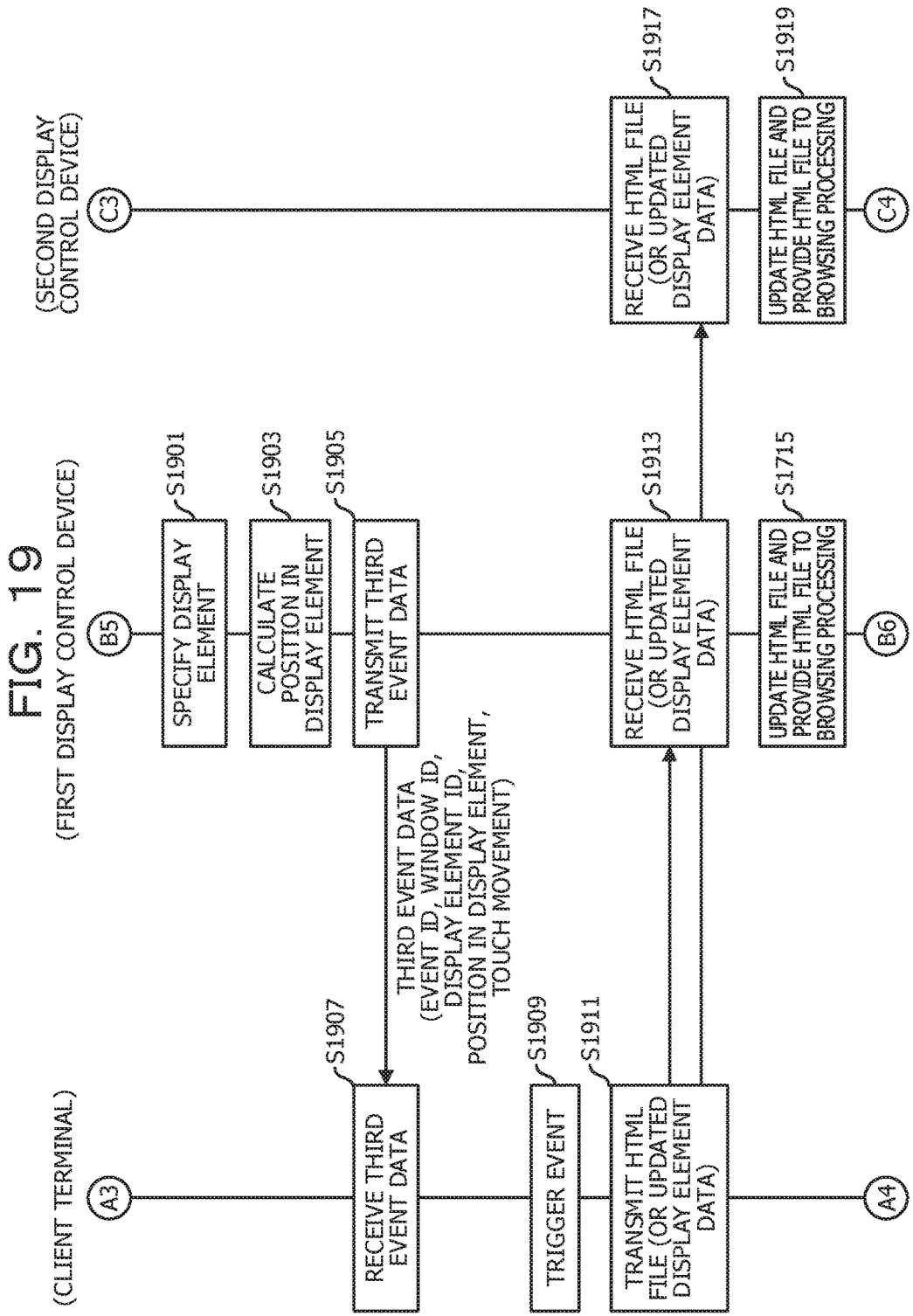
FIG. 19 is a diagram illustrating an exemplary touch movement sequence.

Processing of the second display control device 203 is continued from processing illustrated in FIG. 19 through a connector symbol C4. When the second reception unit 711 of the second display control device 203 receives a touch start event from the OS 701 (S2101), the first calculation unit 713 of the second display control device 203 calculates a position in the window at which the touch start event has occurred (S2101). The second transmitting unit 705 of the second display control device 203 transmits first event data to the server device 205 (S2105). The first event data includes an event ID, a window ID, a position in a window, and an event type (touch start).

In this stage, it is assumed that the elapse-of-time determination unit 817 of the server device 205 determines that a predetermined period of time has not elapsed from a time stamp, similarly as in a case of processing in S2015 (S2107). When the third receiving unit 803 of the server device 205 receives the first event data (S2109), the type determination unit 807 of the server device 205 determines that a type of the event is the touch start (S2111).

In this case, the proximity determination unit 809 of the server device 205 determines whether or not an event is occurring near the position of the first event. The proximity determination unit 809 determines that an event is occurring near the position of the first event, for example, in a case where a distance between a position in the window, which is set in the event record, and a position in the window included in the first event data is less than a threshold value. The proximity determination unit 809 may add, as a condition, matters that the position in the window, which is set in the event record, is located within a predetermined distance from a side which is in contact with an adjacent display area and the position in the window included in the first event data is located within a predetermined distance from a side which is in contact with the adjacent display area. Furthermore, the proximity determination unit 809 may also add, as a condition, matters that an event type which is set in the event record is the touch end and an event type included in the first event data is the touch start.

When the proximity determination unit 809 of the server device 205 determines that an event is occurring near the first event (S2113), the correlation unit 825 of the server device 205 adds an associated record to an association table (S2115).

FIG. 22 illustrates an exemplary association table. In this example, the association table includes a record (in the following, referred to as associated record) associated with an event. The associated record includes a field for setting a main event ID and a field for setting a sub-event ID. The main event ID is an ID of an event occurring nearby when the associated record is added. The sub-event ID is an ID of an event included in first event data when the associated record is added.

Description is made by referring back to FIG. 21. The sequence proceeds from the sequence illustrated in FIG. 21 to a sequence illustrated in FIG. 23 through a connector symbol C5 and a connector symbol D6.

Figure 20:
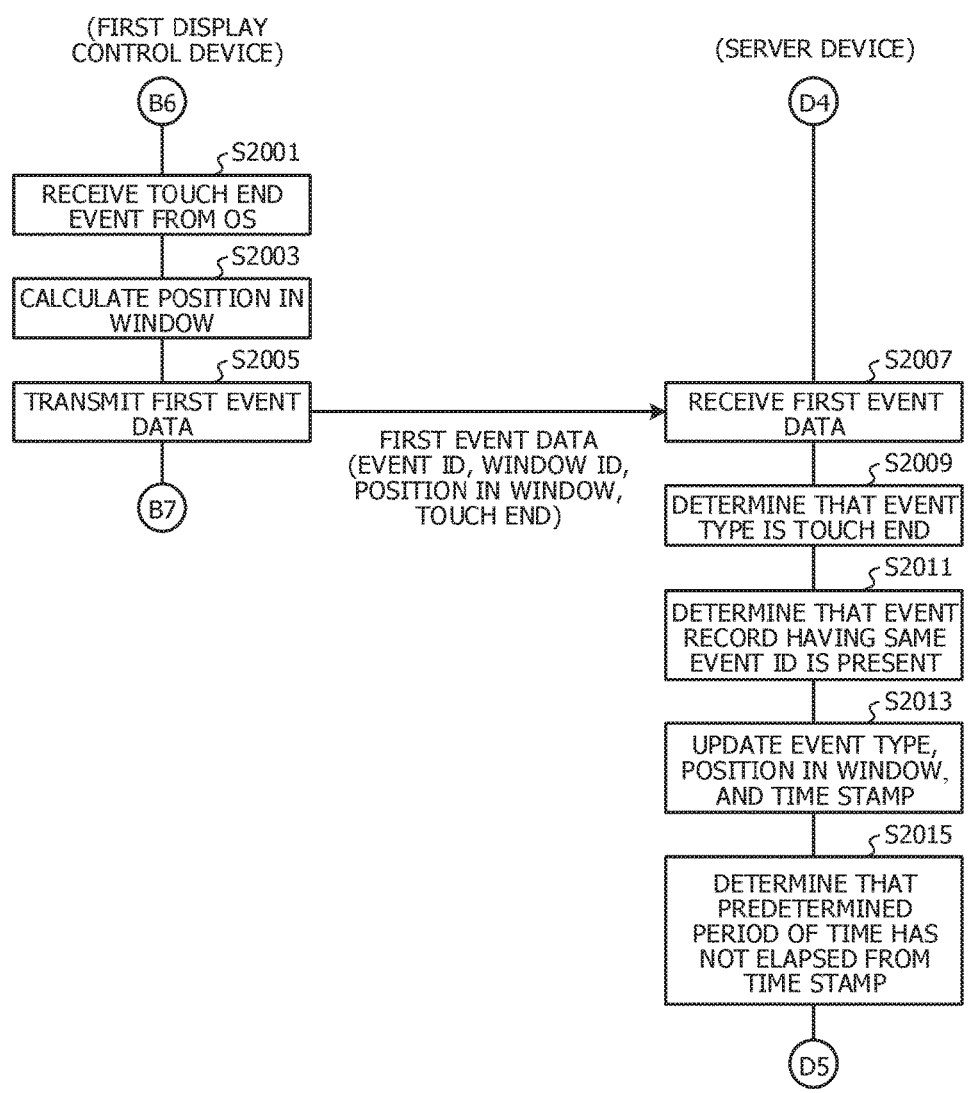
FIG. 20 is a diagram illustrating an exemplary touch end sequence.

Processing of the first display control device 201 is continued from processing illustrated in FIG. 20 through a connector symbol B7. The second reception unit 711 of the second display control device 203 receives a touch movement event from the OS 701 (S2301). The first calculation unit 713 of the second display control device 203 calculates a position in the window at which the touch movement event has occurred (S2303). The second transmitting unit 705 of the second display control device 203 transmits first event data to the server device 205 (S2305). The first event data includes an event ID, a window ID, a position in a window, and an event type (touch movement).

When the third receiving unit 803 of the server device 205 receives the first event data (S2307), the type determination unit 807 of the server device 205 determines that a type of the event is the touch movement (S2309). When the second specifying unit 811 of the server device 205 determines that an event record in which, an event ID included in the first event data is set in a field for a valid event ID, is not present (S2311), the second specifying unit 811 of the server device 205 specifies a main event ID (S2313). Specifically, a main event ID is specified in the associated record in which an event ID included in the first event data is set in the field for the sub-event ID.

The second specifying unit 811 of the server device 205 specifies a main display control device ID (S2315). Specifically, the main display control device ID is specified in the event record in which the main event ID is set in the field for the valid event ID. The second update unit 815 of the server device 205 updates the event type, the position in the window, and the time stamp included in the event record (S2317). The conversion unit 819 of the server device 205 converts the event ID included in the first event data into the main event ID and generates second event data (S2319). The third transmitting unit 801 of the server device 205 transmits the second event data to a main display control device (in this example, first display control device 201) (S2321). The second event data includes an event ID, a window ID, a position in a window, and an event type (touch movement).

The second receiving unit 707 of the first display control device 201 receives the second event data (S2323). The sequence proceeds to a sequence illustrated in FIG. 24 through a connector symbol B8 and a connector symbol C6.

Processing of the client terminal 101 is continued from processing illustrated in FIG. 19 through a connector symbol A4. In the sequence illustrated in FIG. 24, regarding a touch movement event, similar processing to those processing in a range of S1701 to S1719 of FIG. 17 is performed in a range of S2401 to S2419. Regarding subsequent touch movement events, a series of processing described above is repeated. The sequence proceeds to a sequence illustrated in FIG. 25 through a connector symbol C7.

Figure 23:
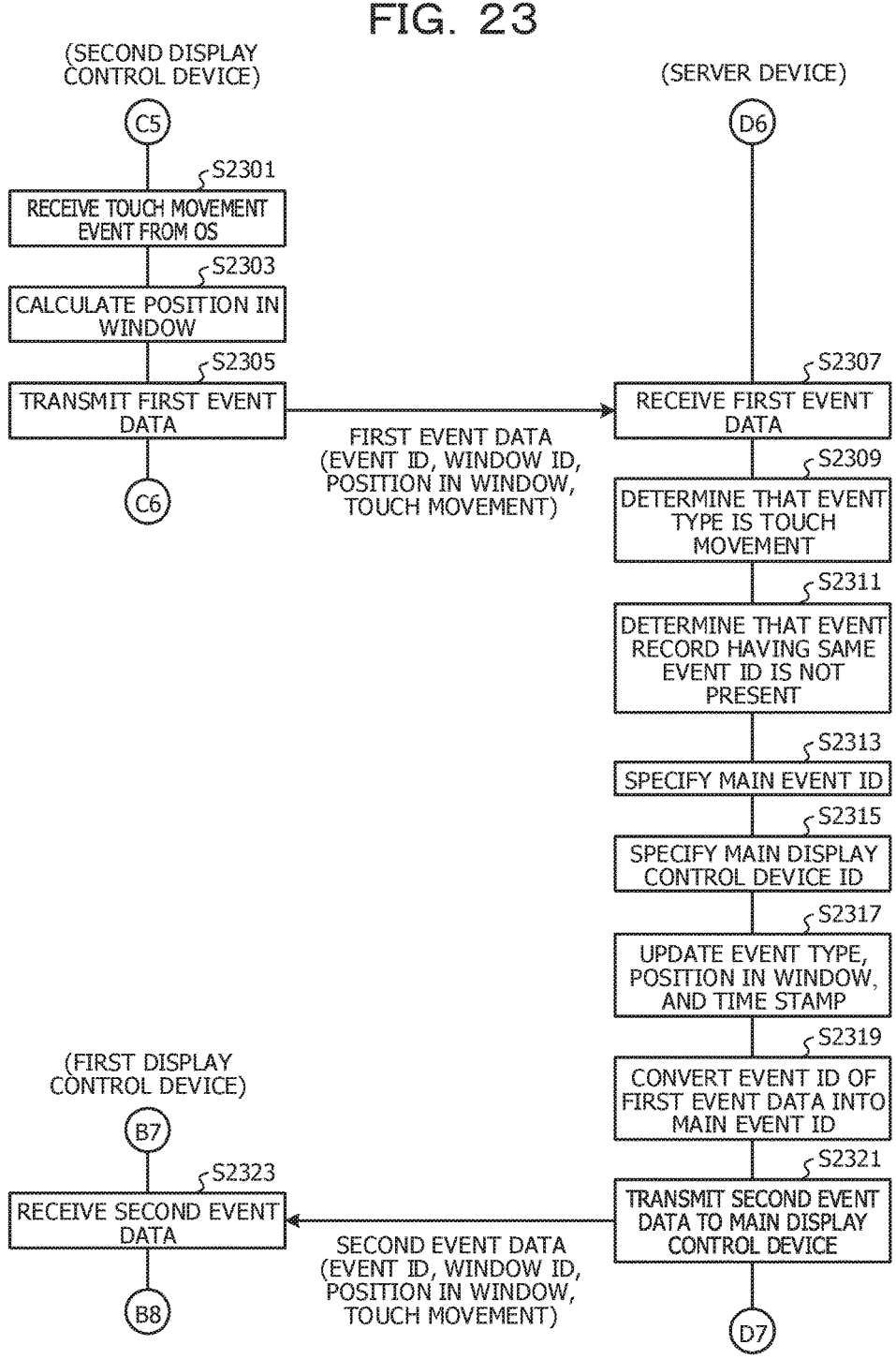
FIG. 23 is a diagram illustrating an exemplary touch movement sequence.

Processing of the server device 205 is continued from processing illustrated in FIG. 23 through a connector symbol D7. When the second reception unit 711 of the second display control device 203 receives a touch end event from the OS 701 (S2501), the first calculation unit 713 of the second display control device 203 calculates a position in the window at which the touch end event has occurred (S2503). The second transmitting unit 705 of the second display control device 203 transmits first event data to the server device 205 (S2505). The first event data includes an event ID, a window ID, a position in a window, and an event type (touch end).

When the third receiving unit 803 of the server device 205 receives the first event data (S2507), the type determination unit 807 of the server device 205 determines that a type of the event is the touch end. (S2509). The second specifying unit 811 of the server device 205 determines that an event record having the same valid event ID as an event ID included in the first event data is not present (S2511). The second specifying unit 811 of the server device 205 specifies the main event ID based on the associated record (S2513).

Figure 26:
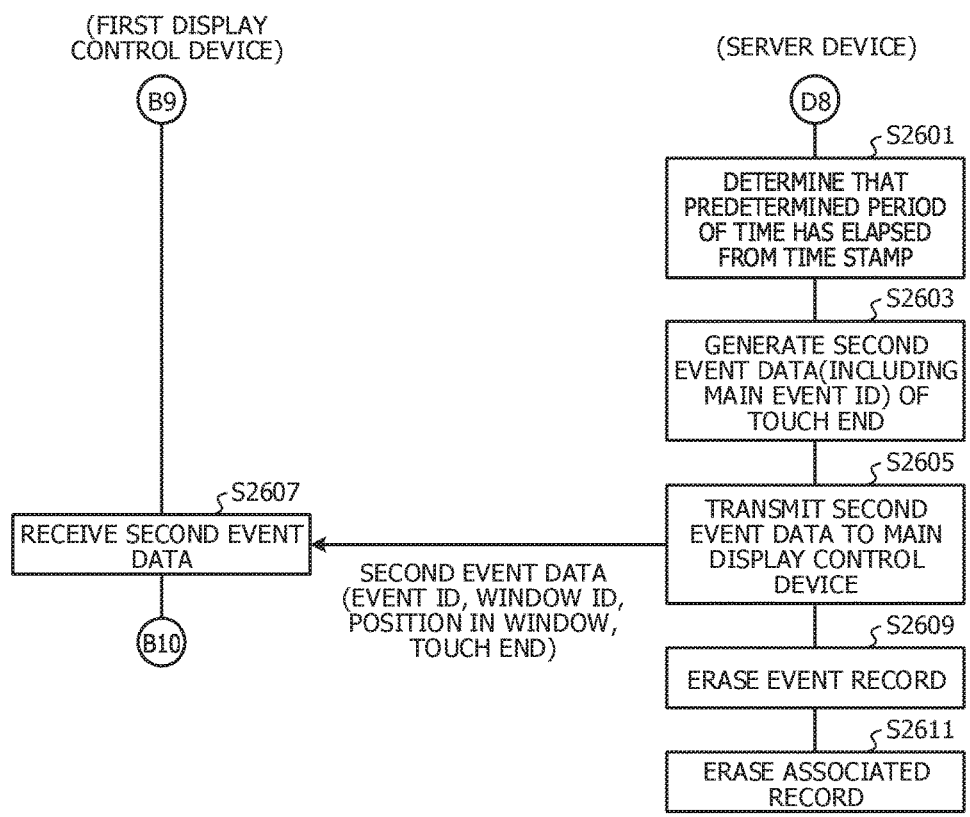
FIG. 26 is a diagram illustrating an exemplary touch end sequence.

The second specifying unit 811 of the server device 205 specifies the main display control device ID based on the event record (S2515). The second update unit 815 of the server device 205 updates the event type, the position in the window, and the time stamp in the event record, for each event type (S2517). The elapse-of-time determination unit 817 of the server device 205 determines that a predetermined period of time has not elapsed from a time stamp of the event record (S2519). The sequence proceeds to a sequence illustrated in FIG. 26 through a connector symbol D8.

Figure 24:
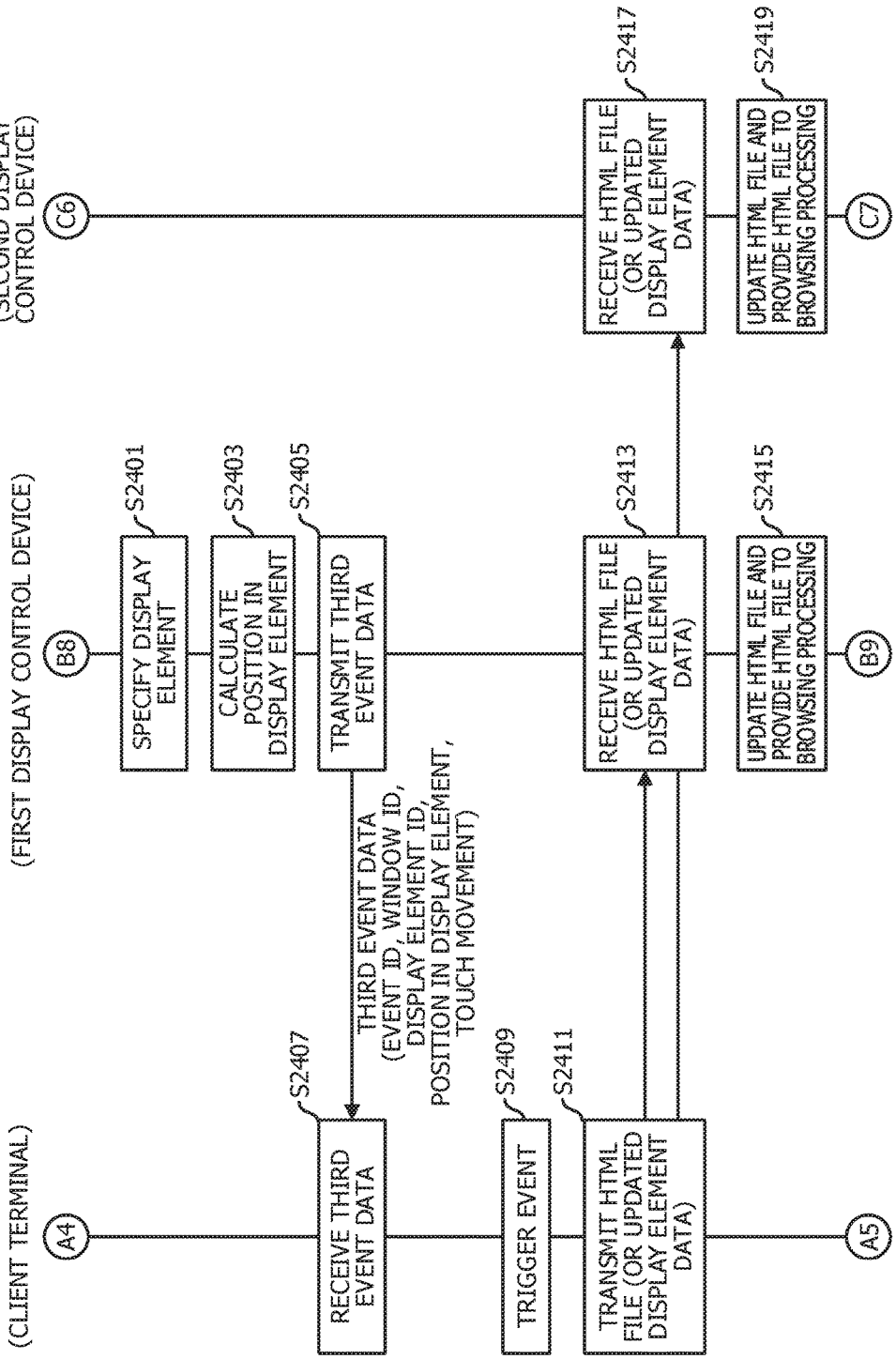
FIG. 24 is a diagram illustrating an exemplary touch movement sequence.
Figure 25:
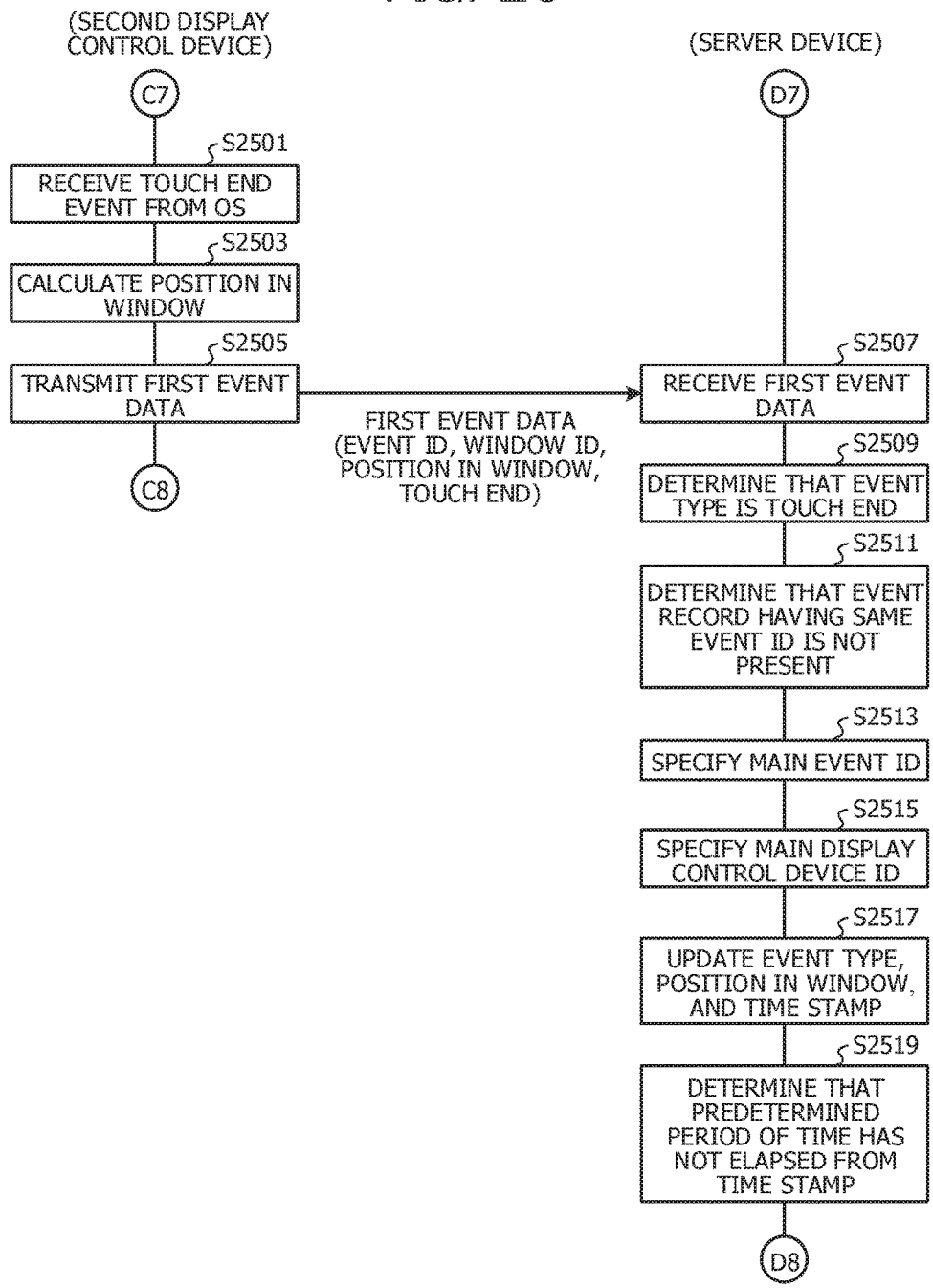
FIG. 25 is a diagram illustrating an exemplary touch end sequence.

Processing of the first display control device 201 is continued from processing illustrated in FIG. 24 through a connector symbol B9. Here, regarding the event record which is a determination target in the processing of S2519 of FIG. 25, the elapse-of-time determination unit 817 of the server device 205 determines that a predetermined period of time has elapsed from a time stamp of the event record (S2601). The generation unit 823 of the server device 205 generates second event data of a touch end based on the event record in which the time stamp, which has elapsed a predetermined period of time, is set (S2603). The second event data includes the main event ID specified in S2513 of FIG. 25, in addition to the window ID, the position in a window, and the event type (touch end). The third transmitting unit 801 of the server device 205 transmits the second event data to the main display control device (S2605).

The second receiving unit 70 of the first display control device 201 receives the second event data (S2607).

Figure 27:
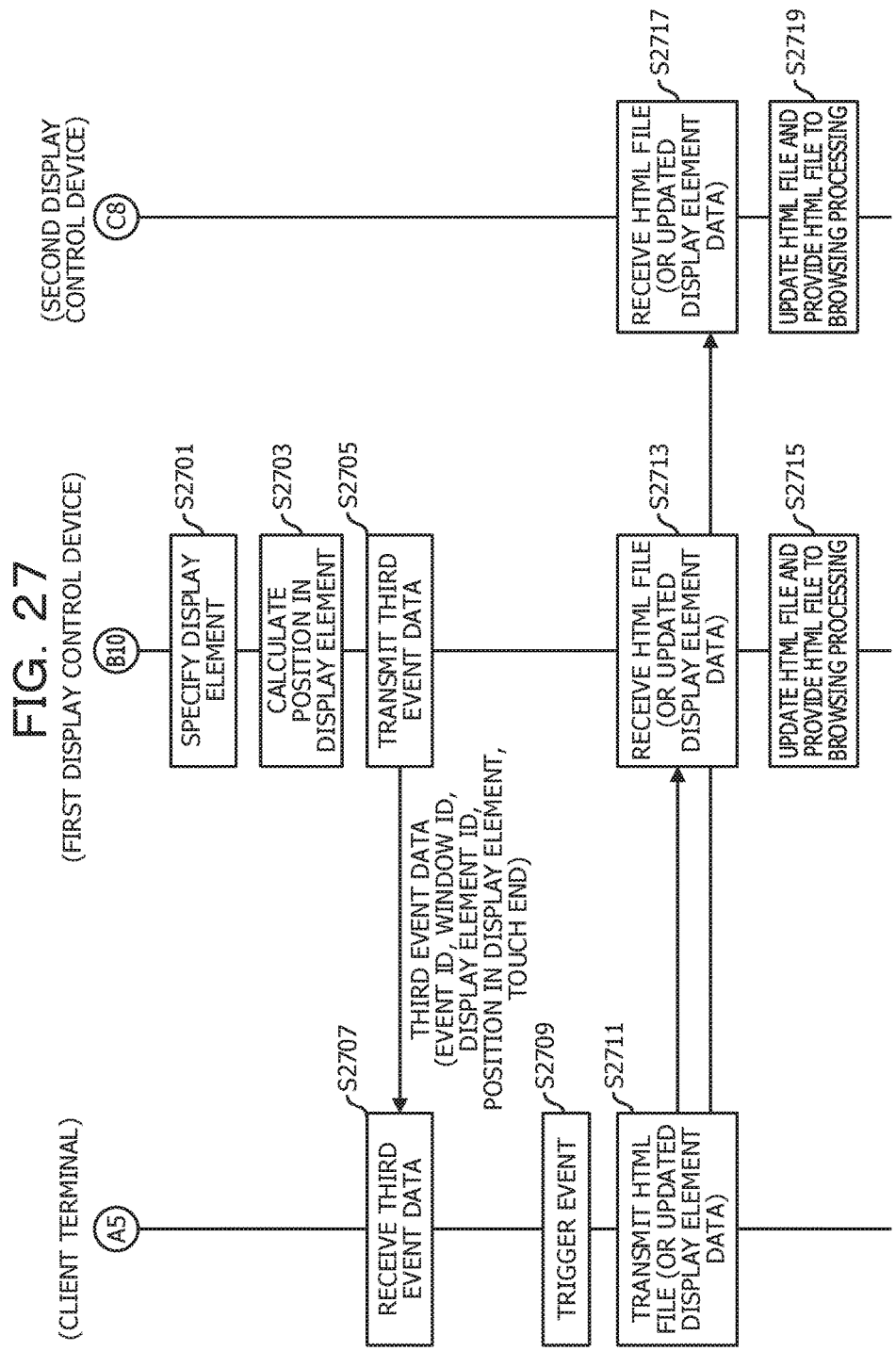
FIG. 27 is a diagram illustrating an exemplary touch end sequence.

On the other hand, the erasure unit 821 of the server device 205 erases an event record corresponding to the event ID included in the second event data (S2609). Furthermore, the erasure unit 821 of the server device 205 erases the associated record in which the event ID is set in any of the fields (S2611). The sequence proceeds to a sequence illustrated in FIG. 27 through a connector symbol B10.

Processing of file client terminal 101 is continued from processing illustrated in FIG. 24 through a connector symbol A5. Processing of the second display control device 203 is continued from processing illustrated in FIG. 25 through a connector symbol C8. In the sequence illustrated in FIG. 27, regarding a touch end event, similar processing to those processing in a range of S1701 to S1719 of FIG. 17 is performed in a range of S2701 to S2719. The processing relating to the event regarding the pattern illustrated in FIG. 4 is complete.

Figure 28:
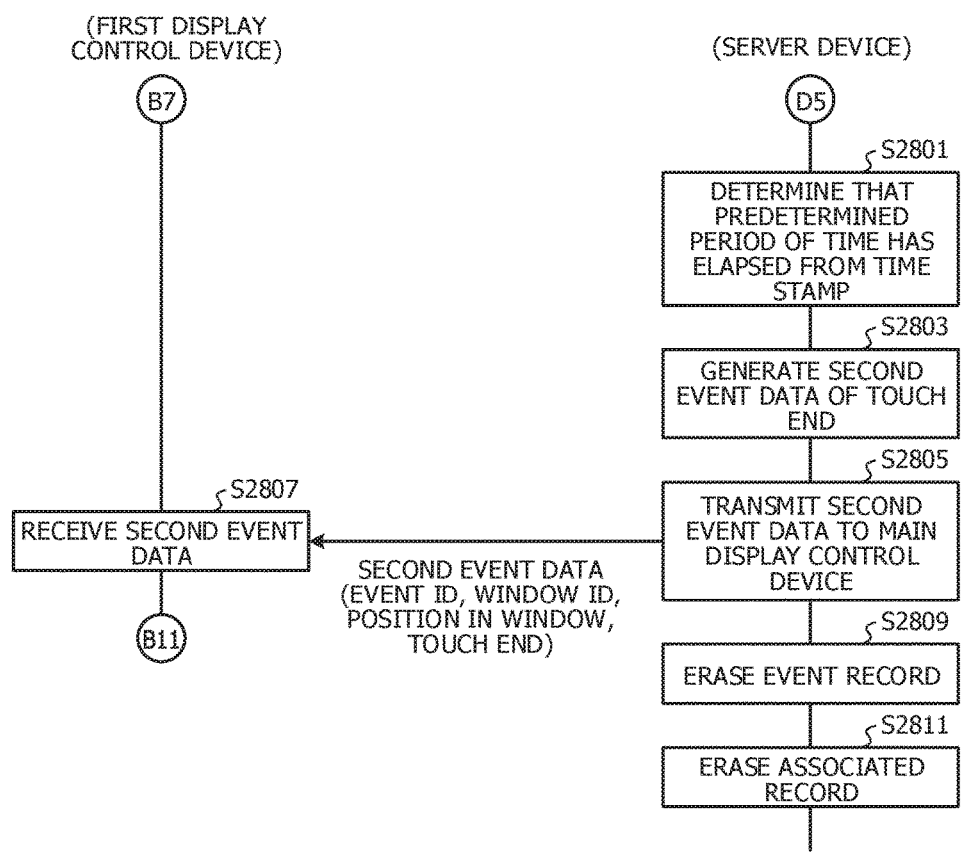
FIG. 28 is a diagram illustrating an exemplary touch end sequence.

Next, description is made on a sequence in a pattern illustrated in FIG. 5. FIG. 28 illustrates a sequence continued from the sequence illustrated in FIG. 20. That is, processing of the first display control device 201 is continued from processing illustrated in FIG. 20 through a connector symbol B7. Processing of the server device 205 is continued from processing illustrated in FIG. 20 through a connector symbol D5.

In this stage, regarding the event record which is a determination target in the processing of S2015 of FIG. 20, the elapse-of-time determination unit 817 of the server device 205 determines that a predetermined period of time has elapsed from a time stamp of the event record (S2801). The generation unit 823 of the server device 205 generates second event data of a touch end based on the event record in which the time stamp, which has elapsed a predetermined period of time, is set (S2803). The second event data includes an event ID which is set in the event record, that is, the main event ID, in addition to the window ID, the position in a window, and the event type (touch end). The third transmitting unit 801 of the server device 205 transmits the second event data to the main display control device (in this example, first display control device 201) (S2805).

The second receiving unit 707 of the first display control device 201 receives the second event data (S2807).

Figure 29:
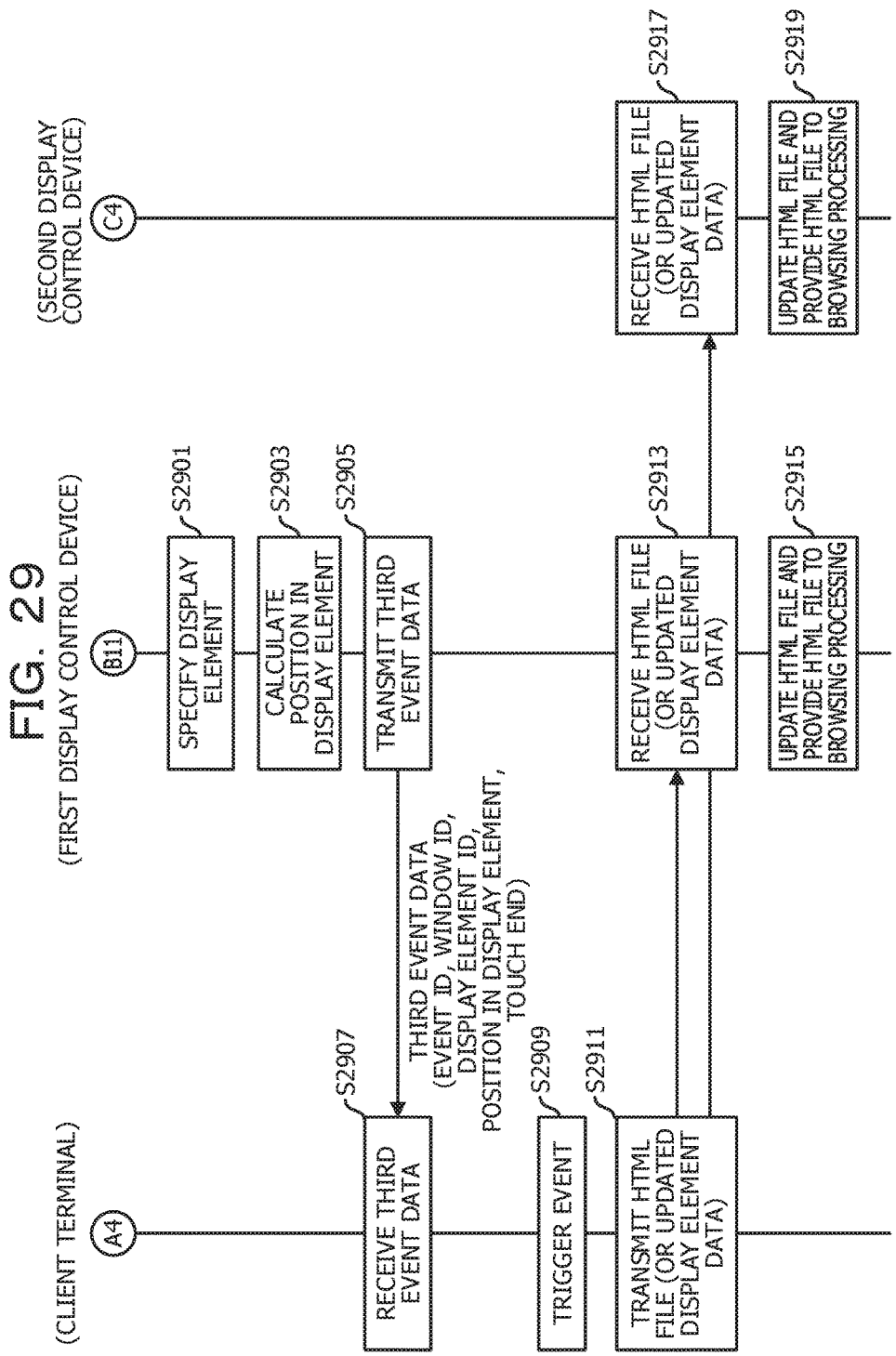
FIG. 29 is a diagram illustrating an exemplary touch end sequence.

On the other hand, the erasure unit 821 of the server device 205 erases an event record corresponding to the event ID included in the second event data (S2809). Furthermore, the erasure unit 821 of the server device 205 erases the associated record in which the event ID is set in any of the fields (S2811). The sequence proceeds to a sequence illustrated in FIG. 29 through a connector symbol B11.

Processing of the client terminal 101 is continued from processing illustrated in FIG. 19 through a connector symbol A4. Processing of the second display control device 203 is continued from processing illustrated in FIG. 19 through a connector symbol C4. In the sequence illustrated in FIG. 29, regarding a touch end event, similar processing to those processing in a range of S1701 to S1719 of FIG. 17 is performed in a range of S2901 to S2919. The processing relating to the event regarding the pattern illustrated in FIG. 5 is complete.

According to the present embodiment, operations extending over display surfaces of a plurality of display devices may be handled as a series of operations.

Since positional relationships are specified based on the window coordinate system and thus processing which specifies the positional relationships is simplified.

[Embodiment 2]

In the present embodiment description is made on an example in which processing on and after start of an event performed in the server device 205 in Embodiment 1 is performed in a main display control device (in this example, a first display control device 201).

Figure 30:
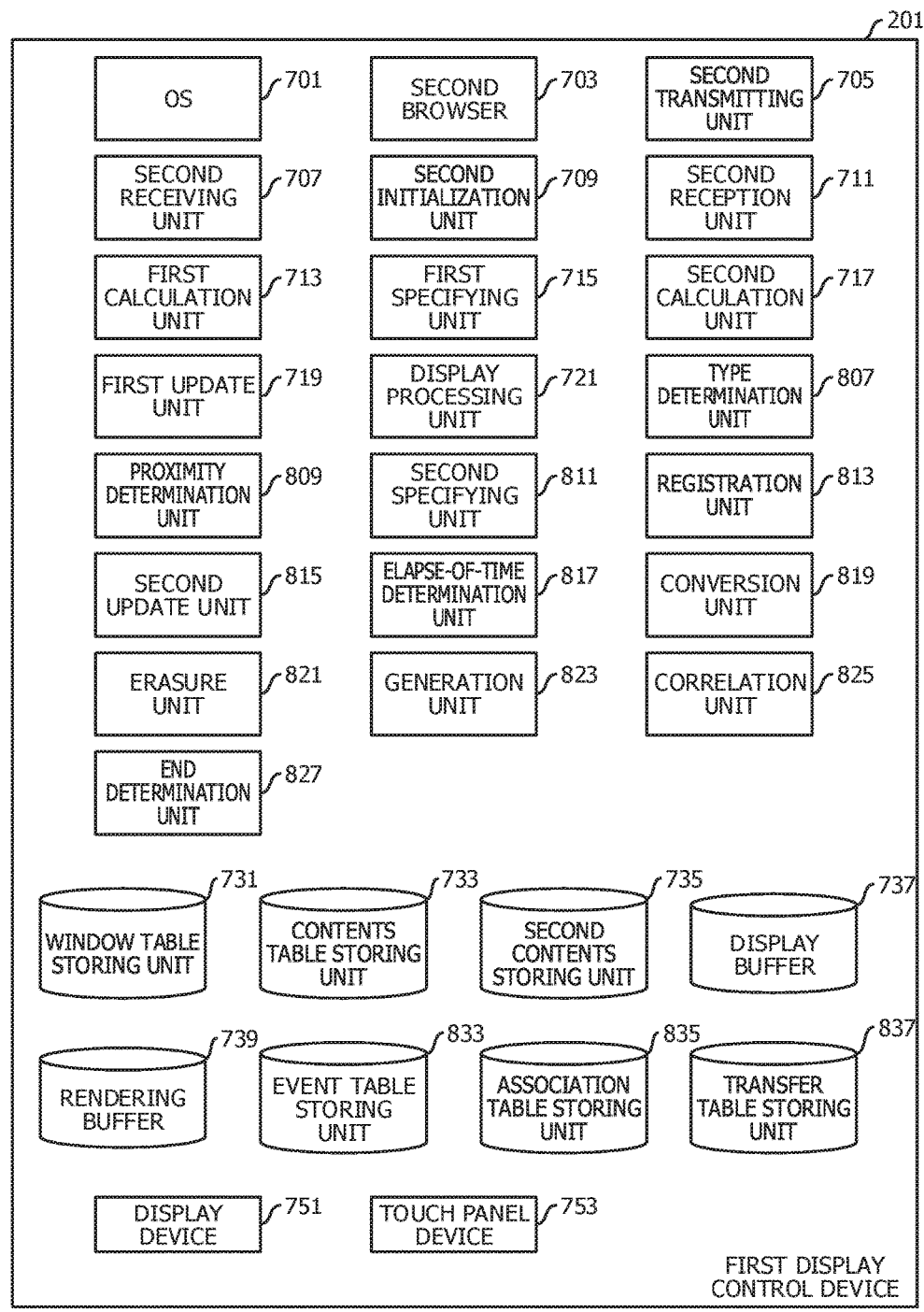
FIG. 30 is a diagram illustrating an exemplary modular configuration of a first display control device according to Embodiment 2.

FIG. 30 illustrates an exemplary modular configuration of the first display control device 201 according to Embodiment 2. The first display control device 201 according to Embodiment 2, includes a type determination unit 807, a proximity determination unit 809, a second specifying unit 811, a registration unit 813, a second update unit 815, an elapse-of-time determination unit 817, a conversion unit 819, an erasure unit 821, a generation unit 823, a correlation unit 825, an event table storing unit 833, an association table storing unit 835, in addition to the modules illustrated in FIG. 7. The first display control device 201 includes an end determination unit 827 and a transfer table storing unit 837. The end determination unit 827 determines whether a position corresponds to an end of a display surface or not. The transfer table storing unit 837 includes a transfer record for each event at which data is to be transferred to another display control device. The transfer record correlates a display control device ID specifying a transfer destination with an ID of an event.

Figure 31:
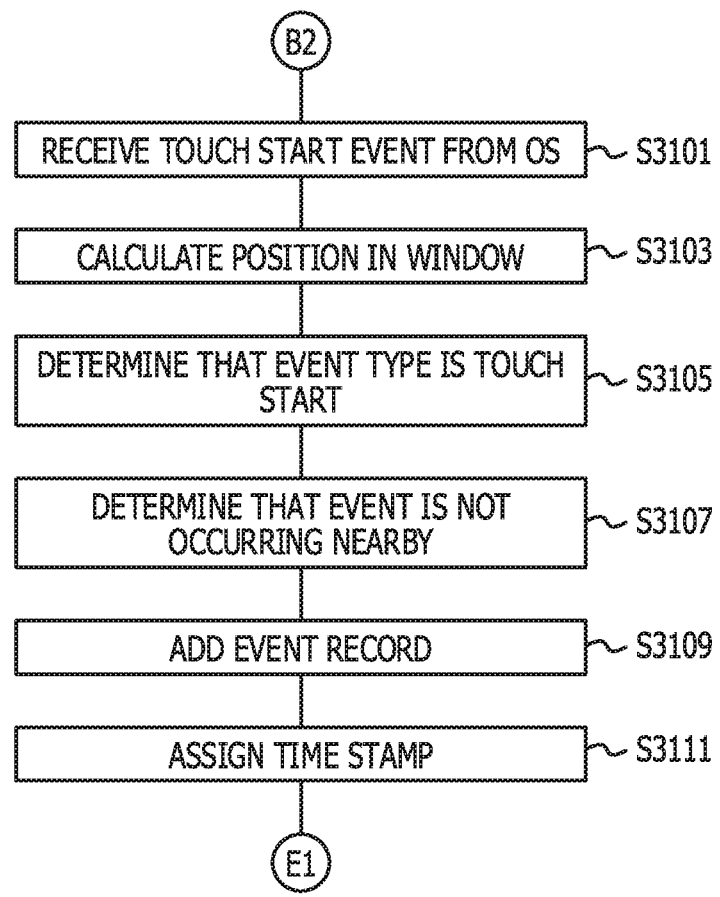
FIG. 31 is a diagram illustrating an exemplary touch start sequence.

Description is made on the sequence in the pattern illustrated in FIG. 4 with reference to FIG. 31. Processing of the first display control device 201 is continued from processing illustrated in FIG. 12 through a connector symbol B2. The second reception unit 711 of the first display control device 201 receives a touch start event from the OS 701 (S3101). The first calculation unit 713 of the first display control device 201 calculates a position in a window at which the touch start event has occurred (S3103). The type determination unit 807 of the first display control device 201 determines whether a type of the event is the touch start or not. When the type determination unit 807 of the first display control device 201 determines that the type of the event is the touch start (S3105), the proximity determination unit 809 of the first display control device 201 determines whether or not an event is occurring nearby. In this example, the end determination unit 827 of the first display control device 201 determines that a touch position does not correspond to an end of the display surface and thus, the proximity determination unit 809 of the first display control device 201 determines that an event is not occurring nearby. In a case where the touch position corresponds to an end of the display surface, the first display control device 201 inquires a display control device of an adjacent display surface about whether an event is occurring nearby. When the proximity determination unit 809 of the first display control device 201 determines that an event is not occurring nearby (S3107), the registration unit 813 of the first display control device 201 adds an event record (S3109). The registration unit 813 of the first display control device 201 assigns a time stamp to an event record (S3111). The sequence proceeds to a sequence illustrated in FIG. 32 through a connector symbol E1.

Processing of the client terminal 101 is continued from processing illustrated in FIG. 12 through the connector symbol A2. Processing of the second display control device 203 is continued from processing illustrated in FIG. 12 through the connector symbol C2. In the sequence illustrated in FIG. 32, regarding a touch start event, similar processing to those processing in a range of S1701 to S1719 of FIG. 17 is performed in a range of S3201 to S3219. The sequence proceeds to a sequence illustrated in FIG. 33 through a connector symbol E2.

When the second reception unit 711 of the first display control device 201 receives a touch movement event from the OS 701 (S3301), the first calculation unit 713 of the first display control device 201 calculates a position in the window at which the touch movement event has occurred (S3303). The second transmitting unit 705 of the first display control device 201 determines whether a transfer record in which an ID of the event is set is present or not. In this example, the ID of the event is not set in the transfer record and thus, it is determined that event data is not to be transferred (S3304). When the type determination unit 807 of the first display control device 201 determines that the type of the event is the touch movement (S3305), the second update unit 815 of the first display control device 201 updates the event type, the position in the window, and the time stamp included in the event record in which the ID of the event is set in the field for the valid event ID (S3307). The sequence proceeds to a sequence illustrated in FIG. 34 through a connector symbol E3.

Figure 32:
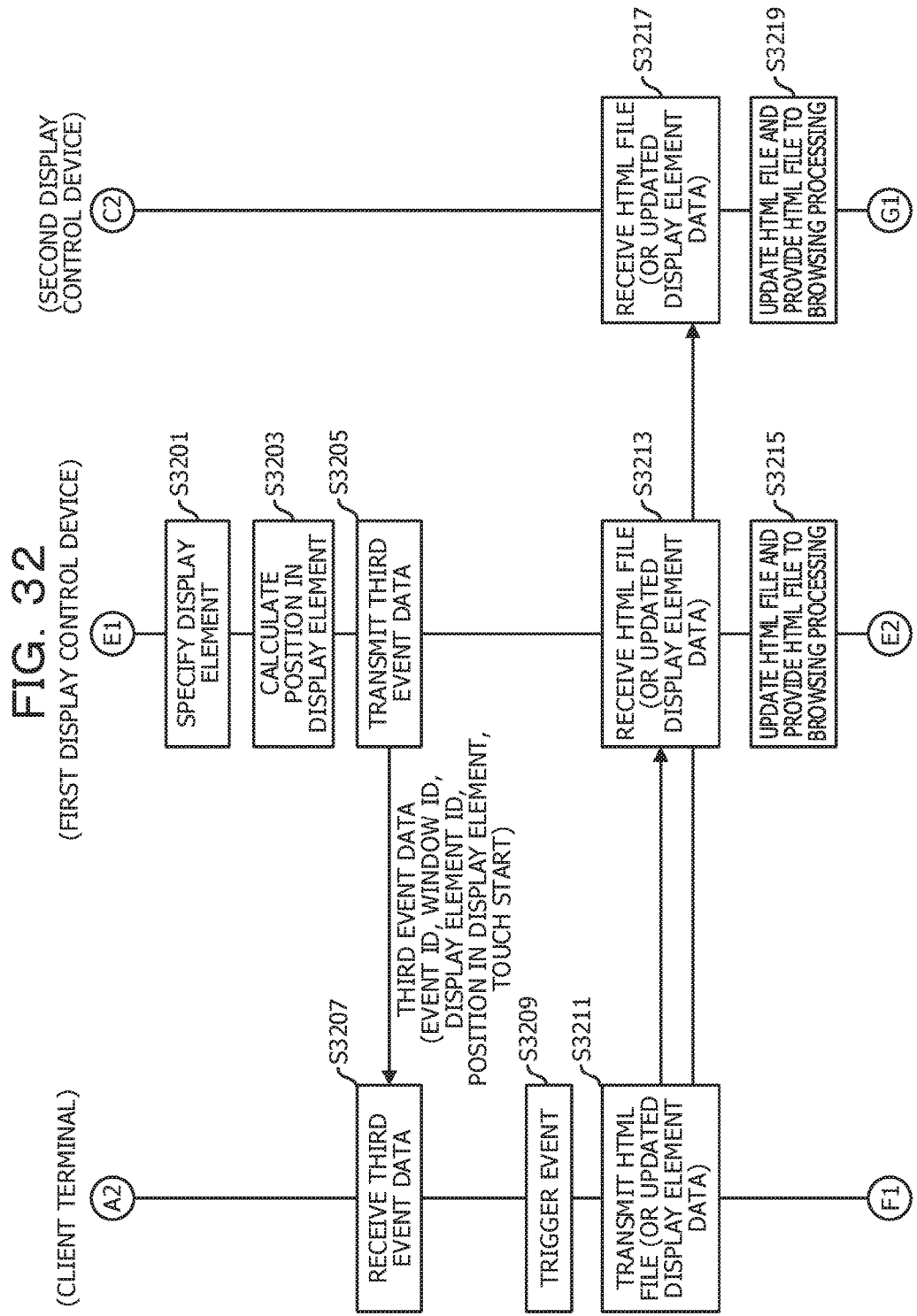
FIG. 32 is a diagram illustrating an exemplary touch start sequence.
Figure 33:
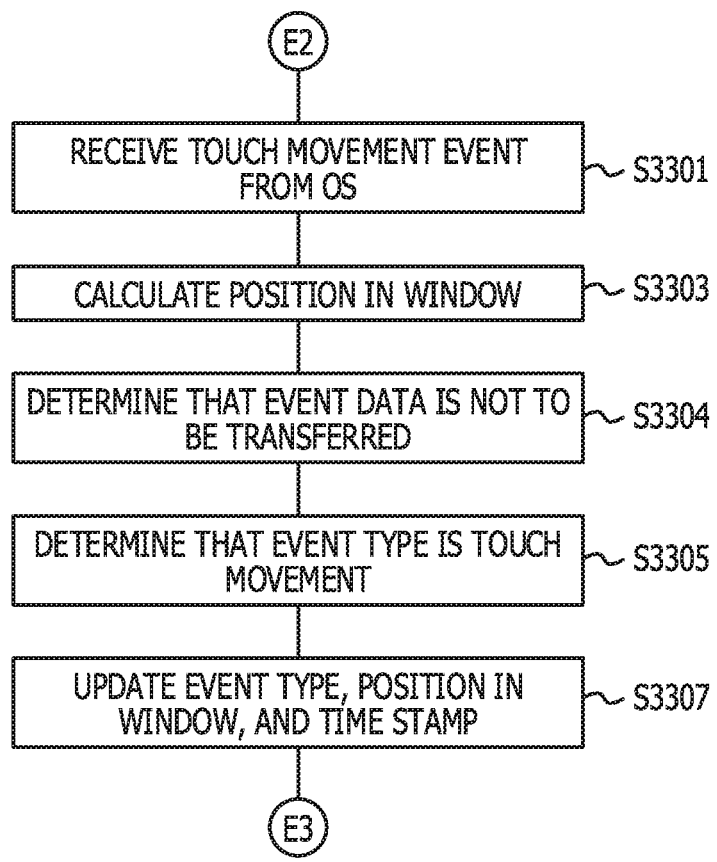
FIG. 33 is a diagram illustrating an exemplary touch movement sequence.

Processing of the client terminal 101 is continued from processing illustrated in FIG. 32 through a connector symbol F1. Processing of the second display control device 203 is continued from processing illustrated in FIG. 32 through a connector symbol G1. In the sequence illustrated in FIG. 34, regarding a touch movement event, similar processing to those processing in a range of S1701 to S1719 of FIG. 17 is performed in a range of S3401 to S3419. The sequence proceeds to a sequence illustrated in FIG. 35 through a connector symbol E4.

Figure 36:
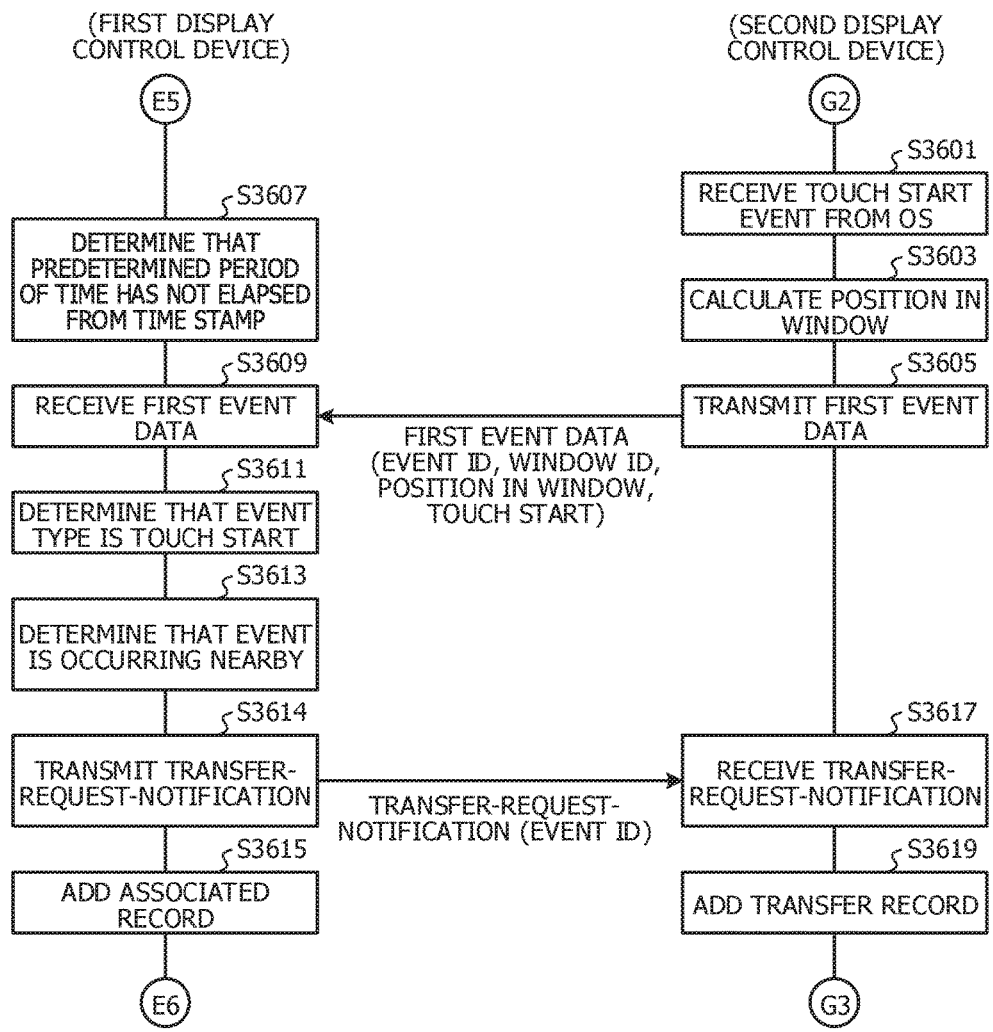
FIG. 36 is a diagram illustrating an exemplary touch start sequence.

When the second reception unit 711 of the first display control device 201 receives a touch end event from the OS 701 (S3501), the first calculation unit 713 of the first display control device 201 calculates a position in the window at which the touch end event has occurred (S3503). The second transmitting unit 705 of the first display control device 201 determines whether a transfer record in which an ID of the event is set is present or not. In this example, the transfer record in which the ID of the event is set is not present and thus, the second transmitting unit 705 of the first display control device 201 determines that event data is not to be transferred (S3504). When the type determination unit 807 of the first display control device 201 determines that the type of the event is a touch end (S3505), the second update unit 815 of the first display control device 201 updates the event type, the position in the window, and the time stamp in the event record corresponding to the ID of the event (S3507). In this stage, the elapse-of-time determination unit 817 of the first display control device 201 determines that a predetermined period of time has not elapsed from the time stamp (S3509). Regarding subsequent touch movement events, a series of processing described above is repeated. The sequence proceeds to a sequence illustrated in FIG. 36 through a connector symbol E5.

Figure 34:
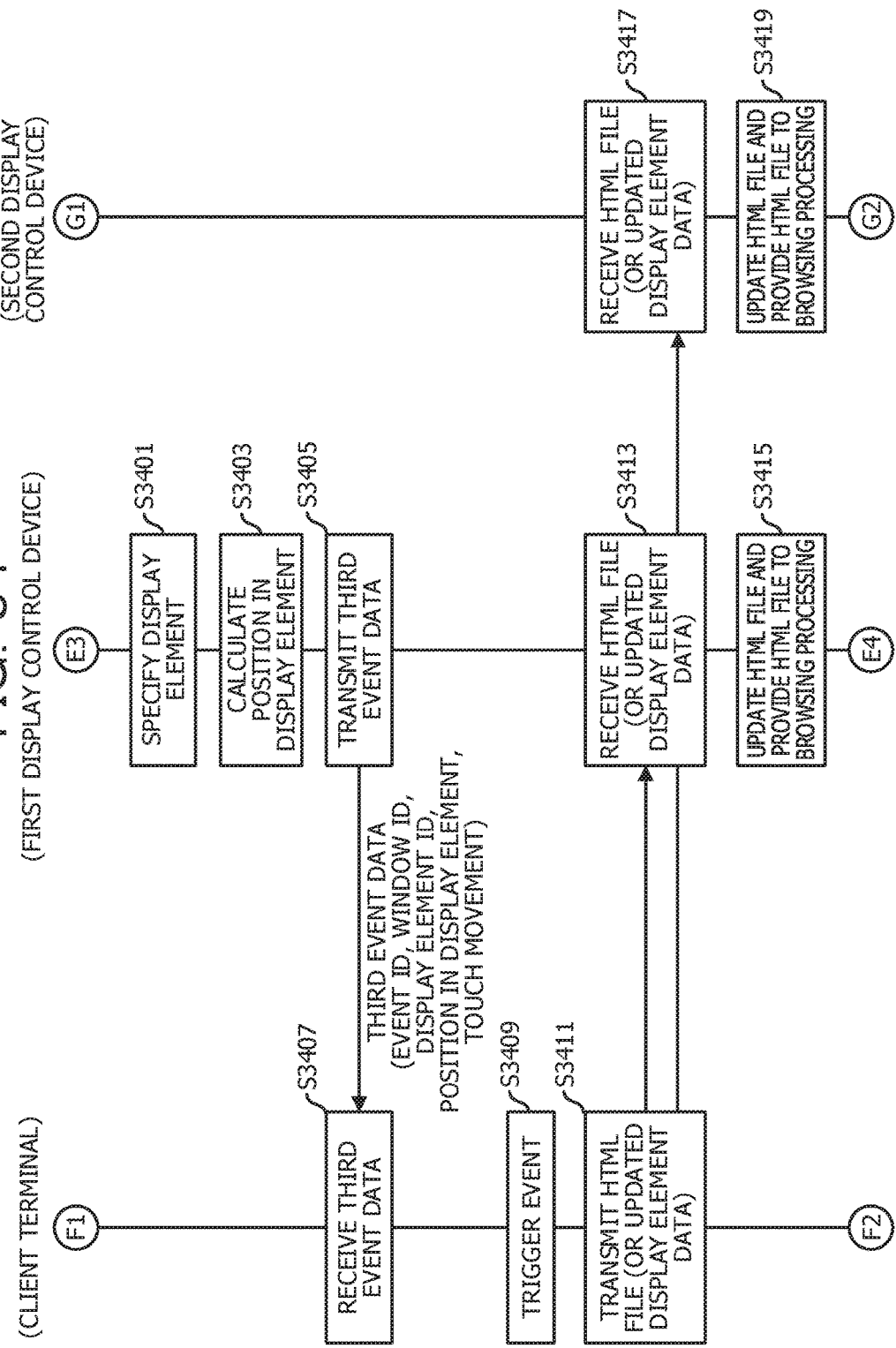
FIG. 34 is a diagram illustrating an exemplary touch movement sequence.

Processing of the second display control device 203 is continued from processing illustrated in FIG. 34 through a connector symbol G2. When the second reception unit 711 of the second display control device 203 receives a touch start event from the OS 701 (S3601), the first calculation unit 713 of the second display control device 203 calculates a position in the window at which the touch start event has occurred (S3603). The second transmitting unit 705 of the second display control device 203 transmits first event data to the first display control device 201 (S3605). The first event data includes an event ID, a window ID, a position in a window, and an event type (touch start).

Figure 35:
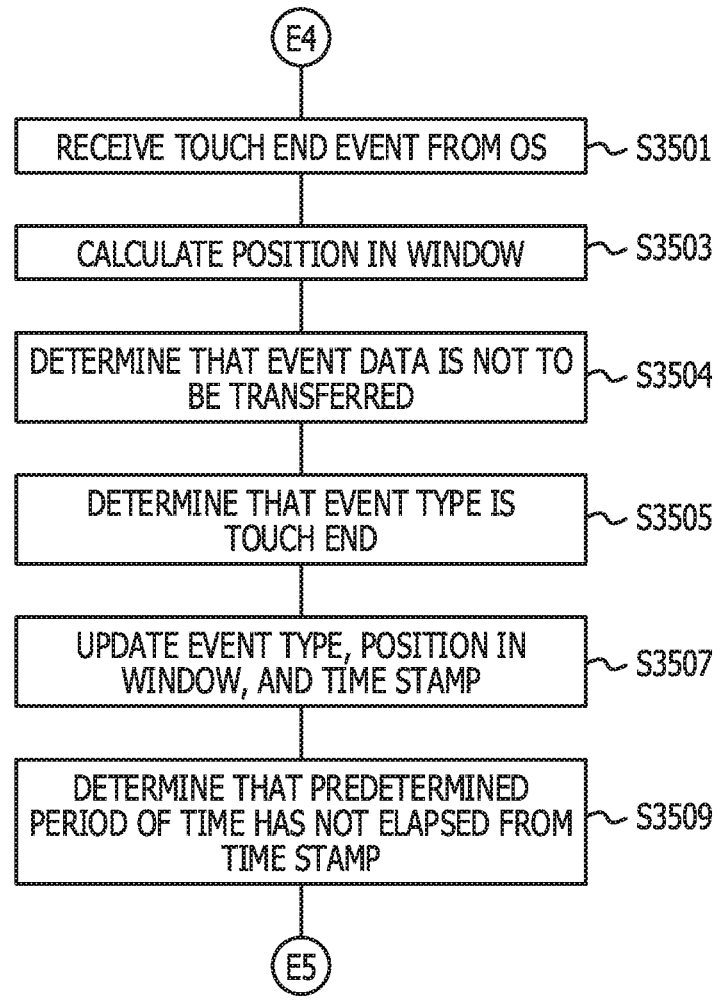
FIG. 35 is a diagram illustrating an exemplary touch end sequence.
Figure 37:
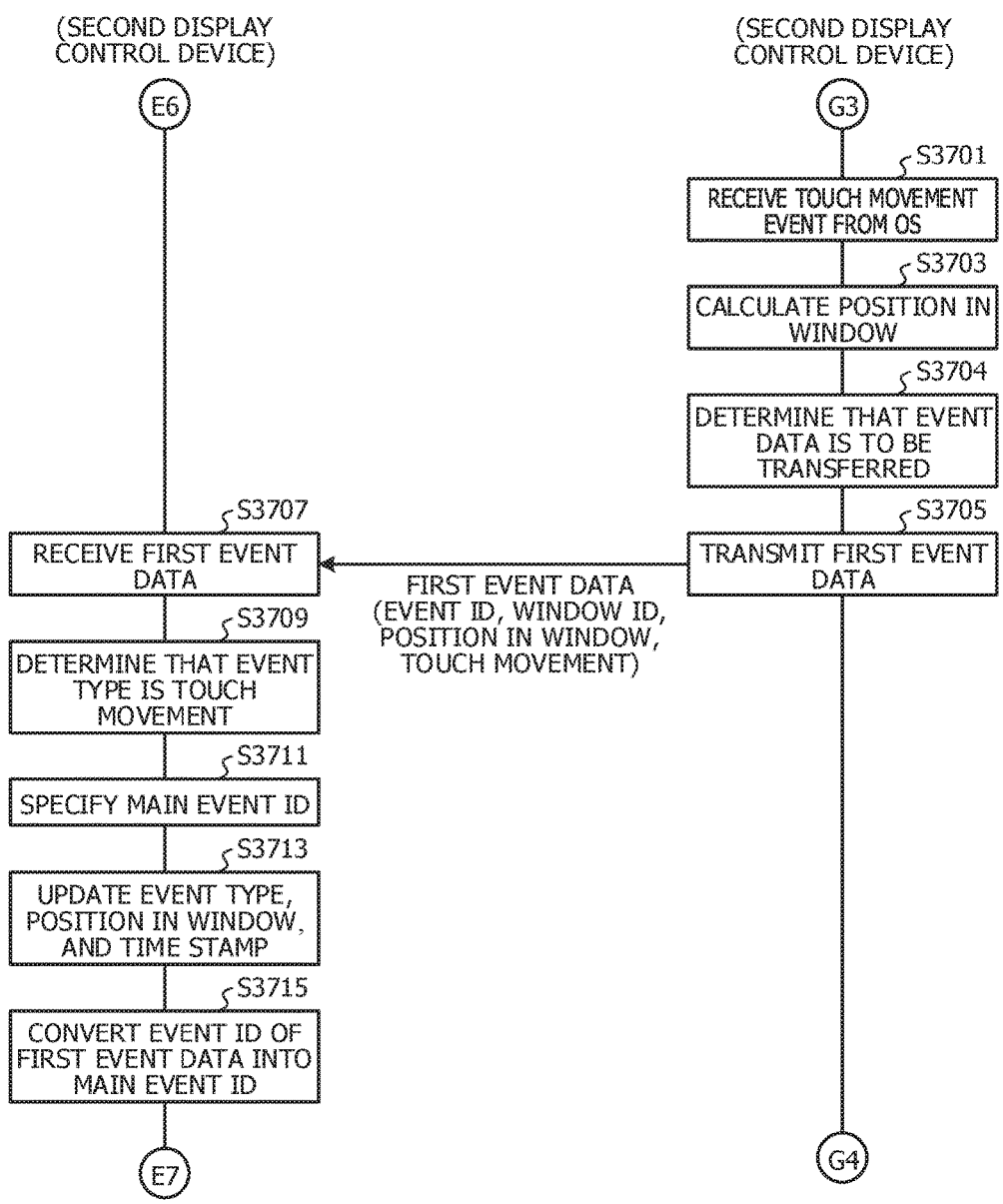
FIG. 37 is a diagram illustrating an exemplary touch movement sequence.

In this stage, it is assumed that the elapse-of-time determination unit 817 of the first display control device 201 determines that a predetermined period of time has not elapsed form a time stamp, similarly as in a case of processing in S3509 illustrated in FIG. 35 (S3607). When the second receiving unit 707 of the first display control device 201 receives the first event data (S3609), the type determination unit 807 of the first display control device 201 determines that a type of the event is the touch start (S3611). When the proximity determination unit 809 of the first display control device 201 determines that an event is occurring nearby (S3613), the second transmitting unit 705 of the first display control device 201 transmits a transfer-request-notification (including an event ID) to the second display control device 203 (S3614) and also, the correlation unit 825 of the first display control device 201 adds an associated record to an association table (S3615). In the field for the main event ID, an ID of an event, which occurs nearby when the associated record is added, is set. In the field for the sub-event ID, an ID of an event, which is included in the first event data when the associated record is added, is set. When the second receiving unit 707 of the second display control device 203 receives a transfer-request-notification (S3617), the correlation unit 825 of the second display control device 203 adds the transfer record (S3619). In the transfer record, the event ID included in transfer-request-notification and an ID of the first display control device 201, which corresponds to a transmission source of the notification, are set. The sequence proceeds to a sequence illustrated in FIG. 37 through a connector symbol E6 and a connector symbol G3.

When the second reception unit 711 of the second display control device 203 receives a touch movement event from the OS 701 (S3701), the first calculation unit 713 of the second display control device 203 calculates a position in the window at which the touch movement event has occurred (S3703). The second transmitting unit 705 of the second display control device 203 determines whether a transfer record in which an ID of the event is set is present or not. In this example, the transfer record in which the ID of the event is set is present and thus, the second transmitting unit 705 of the second display control device 203 determines that event data is to be transferred (S3704). The second transmitting unit 705 of the second display control device 203 transmits first event data to the first display control device 201 (S3705). The first event data includes an event ID, a window ID, a position in a window, and an event type (touch movement).

When the second receiving unit 707 of the first display control device 201 receives the first event data (S3707), the type determination unit 807 of the first display control device 201 determines that the type of the event is the touch movement (S3709). The second specifying unit 811 of the first display control device 201 specifies the main event ID (S3711). Specifically, a main event ID is specified in the associated record in which an event ID included in the first event data is set in the field for the sub-event ID. The second update unit 815 of the first display control device 201 updates the event type, the position in the window, and the time stamp included in the event record in which the main event ID is set in the field for the valid event ID (S3713). The conversion unit 819 of the first display control device 201 converts the event ID of the first event data into a main event ID and generates second event data (S3715). The sequence proceeds to a sequence illustrated in FIG. 38 through a connector symbol E7 and a connector symbol G4.

Processing of the client terminal 101 is continued from processing illustrated in FIG. 34 through a connector symbol F2. In the sequence illustrated in FIG. 38, regarding a touch movement event, similar processing to those processing in a range of S1701 to S1719 of FIG. 17 is performed in a range of S3801 to S3819. The sequence proceeds to a sequence illustrated in FIG. 39 through a connector symbol E8 and a connector symbol G5.

When the second reception unit 711 of the second display control device 203 receives a touch end event from the OS 701 (S3901), the first calculation unit 713 of the second display control device 203 calculates a position in the window at which the touch end event has occurred (S3903). The second transmitting unit 705 of the second display control device 203 determines whether a transfer record in which an ID of the event is set is present or not. In this example, the transfer record in which the ID of the event is set is present and thus, the second transmitting unit 705 of the second display control device 203 determines that event data is to be transferred (S3904). The second transmitting unit 705 of the second display control device 203 transmits first event data to the first display control device 201 (S3905). The first event data includes an event ID, a window ID, a position in a window, and an event type (touch end). The erasure unit 821 of the second display control device 203 erases the transfer record (S3906).

Figure 40:
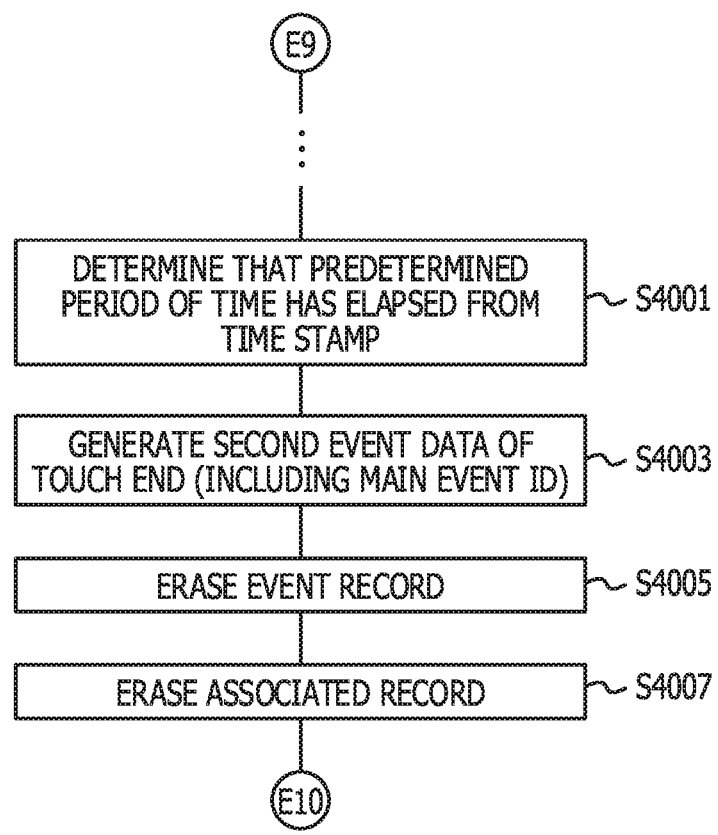
FIG. 40 is a diagram illustrating an exemplary touch end sequence.

When the second receiving unit 707 of the first display control device 201 receives the first event data (S3907), the type determination unit 807 of the first display control device 201 determines that the type of the event is the touch end (S3909). The second specifying unit 811 of the first display control device 201 specifies a main event ID based on the associated record (S3911). The second update unit 815 of the first display control device 201 updates the event type, the position in the window, and the time stamp in the event record in which the main event ID is set in the field for the valid event ID (S3913). In this stage, the elapse-of-time determination unit 817 of the first display control device 201 determines that a predetermined period of time has not elapsed from the time stamp (S3915). The sequence proceeds to a sequence illustrated in FIG. 40 through a connector symbol E9.

Figure 41:
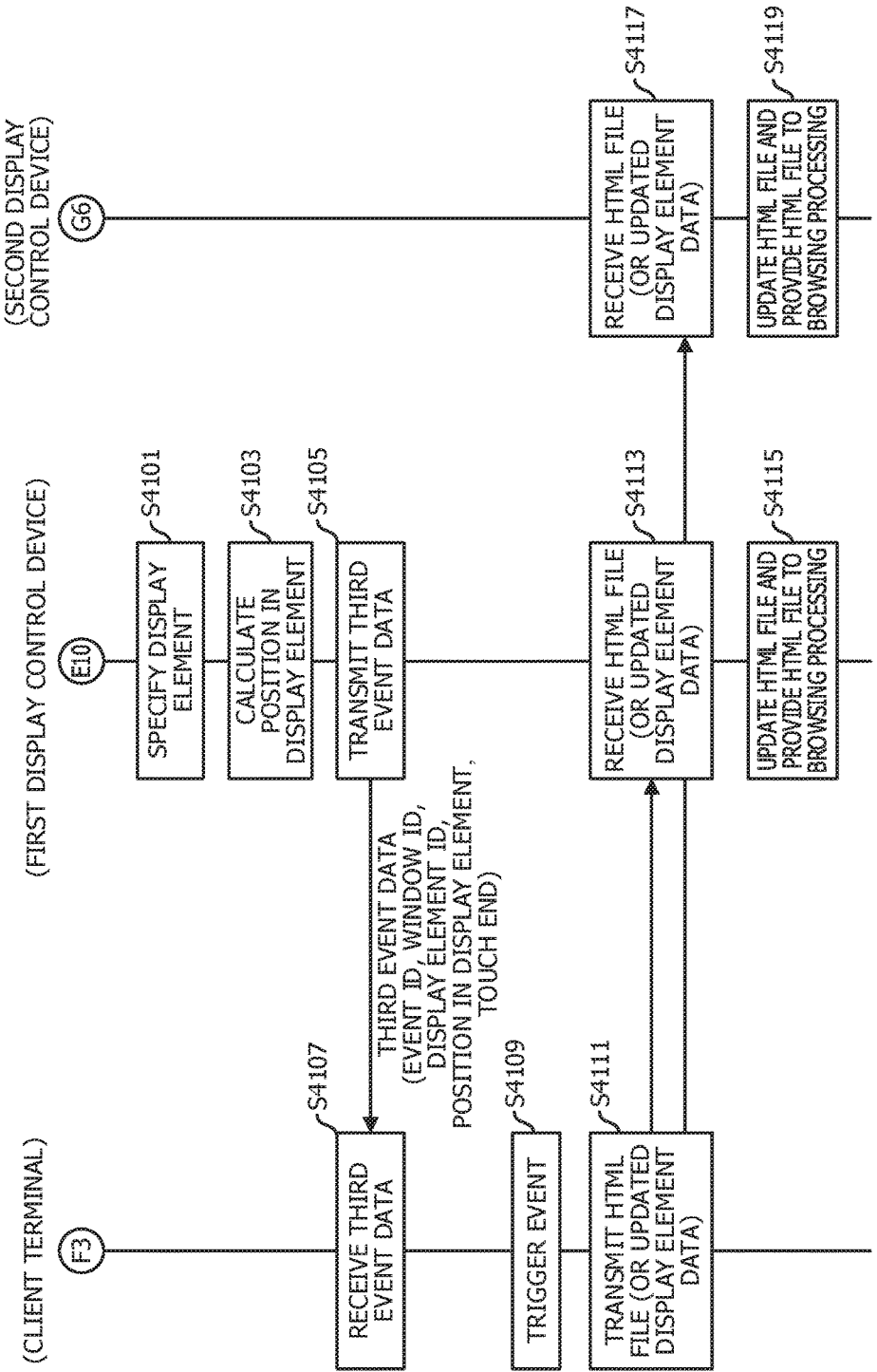
FIG. 41 is a diagram illustrating an exemplary touch end sequence.

Thereafter, when the elapse-of-time determination unit 817 of the first display control device 201 determines that a predetermined period of time has elapsed from the time stamp (S4001), the generation unit 823 of the first display control device 201 generates second event data (including main event ID) of a touch end (S4003). The erasure unit 821 of the first display control device 201 erases an event record in which a main event ID is set in the field for the valid event ID (S4005). The erasure unit 821 of the first, display control device 201 erases the associated record including the main event ID (S4007). The sequence proceeds to a sequence illustrated in FIG. 41 through a connector symbol E10.

Figure 38:
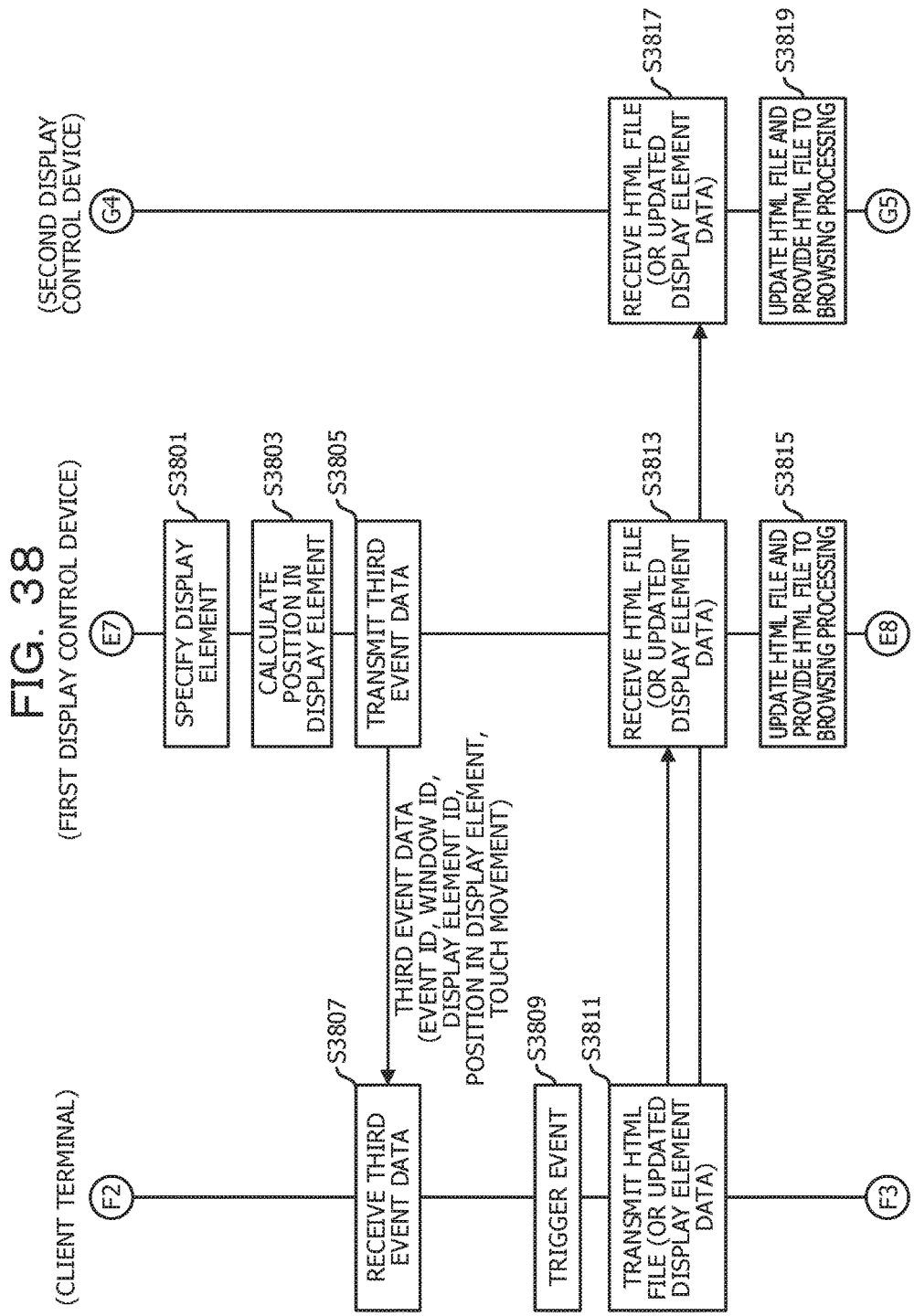
FIG. 38 is a diagram illustrating an exemplary touch movement sequence.
Figure 39:
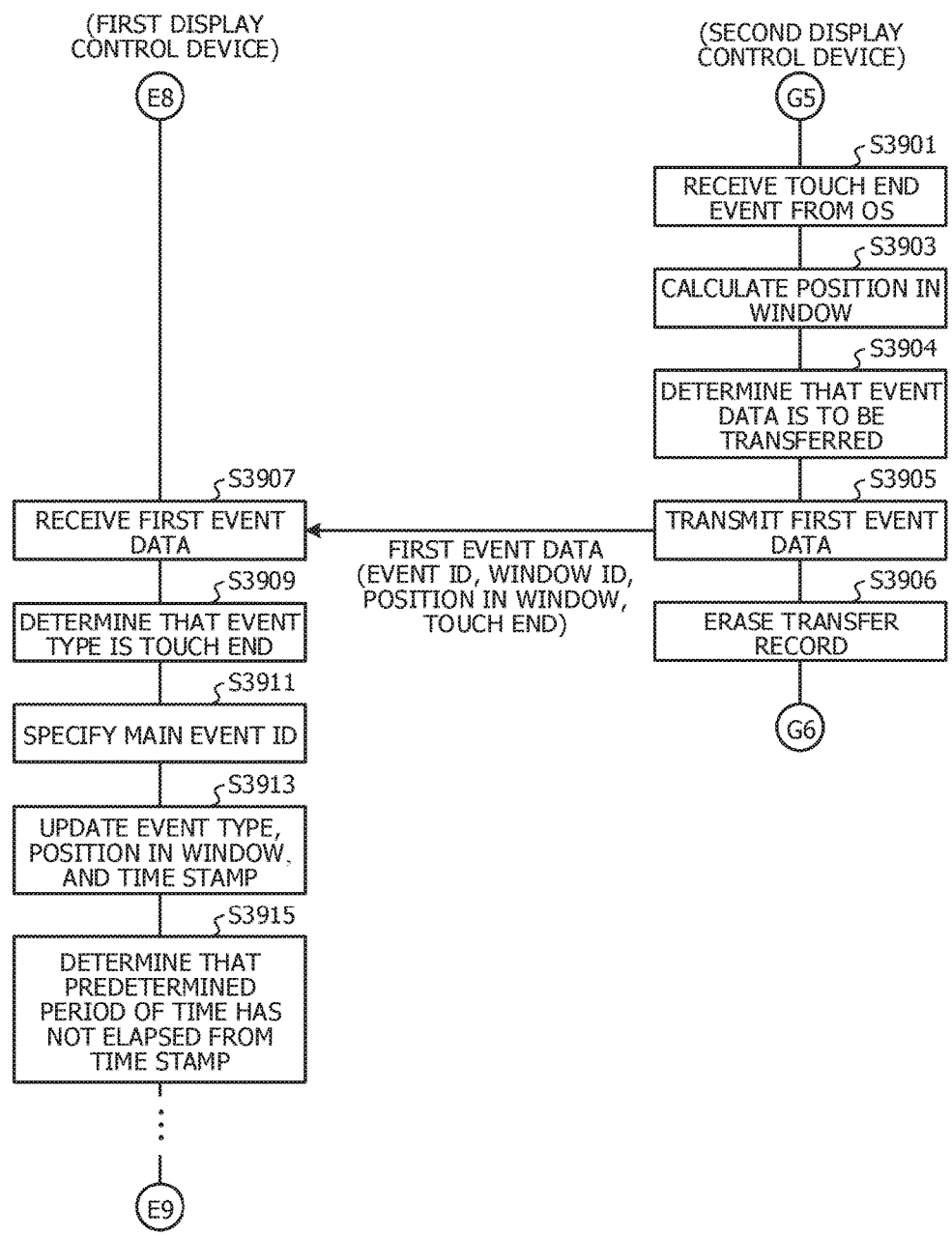
FIG. 39 is a diagram illustrating an exemplary touch end sequence.

Processing of the client terminal 101 is continued from processing illustrated in FIG. 38 through a connector symbol F3. Processing of the second display control device 203 is continued from processing illustrated in FIG. 39 through a connector symbol G6. In the sequence illustrated in FIG. 41, regarding a touch end event, similar processing to those processing in a range of S1701 to S1719 of FIG. 17 is performed in a range of S4101 to S4119. The processing relating to the event regarding the pattern illustrated in FIG. 4 is complete.

Figure 42:
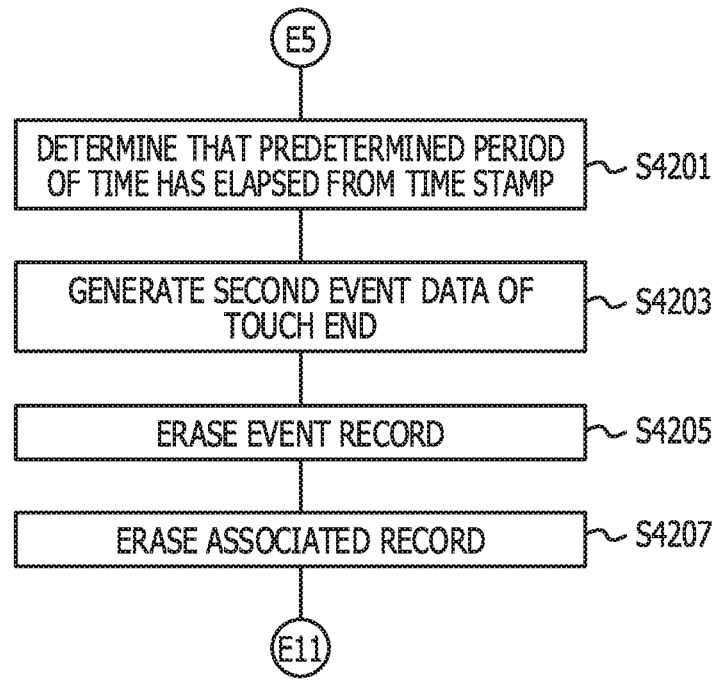
FIG. 42 is a diagram illustrating an exemplary touch end sequence.
Figure 43:
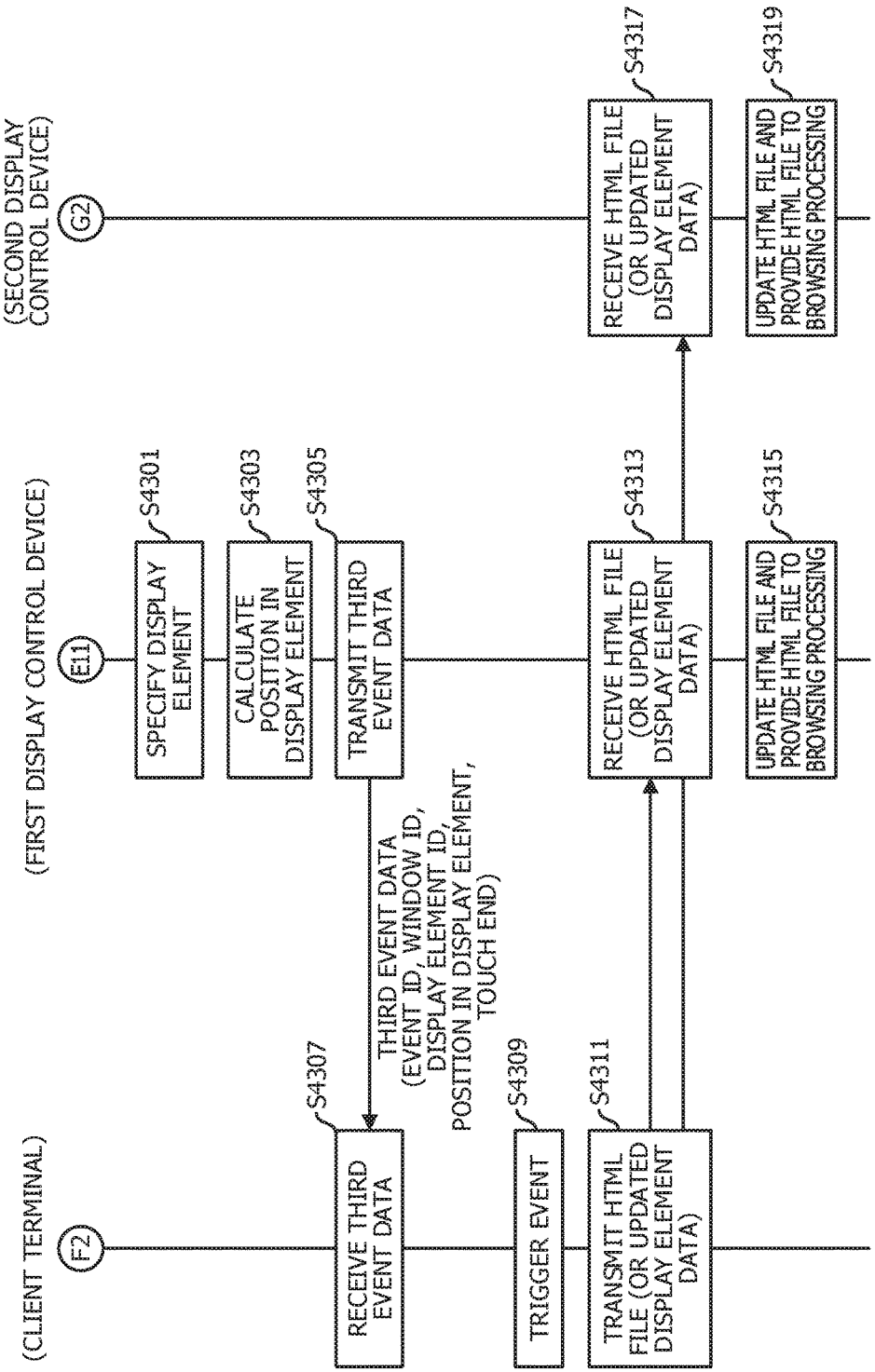
FIG. 43 is a diagram illustrating an exemplary touch end sequence.

Next, description is made on a sequence in a pattern illustrated in FIG. 5 with reference to FIG. 42. Processing of the first display control device 201 is continued from processing illustrated in FIG. 35 through a connector symbol E5. When the elapse-of-time determination unit 817 of the first display control device 201 determines that a predetermined period of time has elapsed from the time stamp (S4201), the generation unit 823 of the first display control device 201 generates second event data of a touch end based on an event record in which the time stamp, which has elapsed from predetermined period of time, is set (S4203). The erasure unit 821 of the first display control device 201 erases an event record in which a main event ID is set in the field for the valid event ID (S4205). The erasure unit 821 of the first display control device 201 erases the associated record including the main event ID (S4207). The sequence proceeds to a sequence illustrated in FIG. 43 through a connector symbol E11.

Processing of the client terminal 101 is continued from processing illustrated in FIG. 34 through the connector symbol F2. Processing of the second display control device 203 is continued from processing illustrated in FIG. 34 through the connector symbol G2. In the sequence illustrated in FIG. 43, regarding a touch end event, similar processing to those processing in a range of S1701 to S1719 of FIG. 17 is performed in a range of S4301 to S4319. The processing relating to the event regarding the pattern illustrated in FIG. 5 is complete.

According to the present embodiment a data transfer amount is reduced to be a relatively small extent.

FIG. 44 illustrates an exemplary hardware configuration of the client terminal 101. The client terminal 101 includes a processor 4401, a storing unit 4403, an antenna 4411, a radio control unit 4413, an audio control unit 4415, a speaker 4417, a microphone 4419, a display 4421, a touch pad 4423, a camera 4425, and a GPS device 4427.

The processor 4401 may be constituted with a modem central processing unit (CPU) and an application CPU. The storing unit 4403 includes, for example, a read only memory (ROM) 4405 and a random access memory (RAM) 4407, and a flash memory 4409. The ROM 4405 stores, for example, a program or data which is set in advance. The RAM 4407 includes, for example, an area used for developing a program such as an application or data. The flash memory 4409 stores, for example, a program such as an operating system or an application and also stores data at appropriate times.

The touch pad 4423 is, for example, a panel-shaped sensor disposed on a display surface of the display 4421 and receives a touch operation. The display 4421 displays, for example, various screens in which an application is displayed. Specifically, a touch panel in which the display 4421 and the touch pad 4423 are formed as an integrated body is used. A touch event occurs by a touch operation onto the touch pad 4423. Other than the touch pad 4423, a key pad may be provided.

The antenna 4411 receives, for example, radio data transmitted through a cellular communication scheme. The radio control unit 4413 controls radio communication. Voice communication or data communication by telephone is performed by controlling radio communication.

The audio control unit 4415 performs an analog-to-digital conversion and a digital-to analog conversion for sound data. The speaker 4417 outputs analog data as a sound. The microphone 4419 converts a sound to analog data.

The camera 4425 is used for capturing a moving image or a photographic image. The GPS device 4427 measures a position.

Although embodiments of the present disclosure have been described, the present disclosure is not limited thereto. For example, a configuration of functional blocks described above may not coincide with a configuration of program modules.

The configuration of each storing area described above is an example, and each storing area is not limited to the configuration described above. Furthermore, in a flow of processing, an order of processing may be changed or a plurality of processing may be executed in parallel as long as a processing result is not changed.

The first display control device 201, the second display control device 203, and the server device 205 described above are computer devices and as illustrated in FIG. 45, a memory 2501, a central processing unit (CPU) 2503, a hard disk drive (HDD) 2505, a display control unit 2507 connected to a display device 2509, a drive device 2513 for a removable disk 2511, an input device 2515, and a communication control unit 2517 for connecting to a network are connected by a bus 2519. An operating System (OS) and an application program for embodying processing in the present embodiments are stored in the HDD 2505 and are read into the memory 2501 from the HDD 2505 when being executed by the CPU 2503. The CPU 2503 causes a predetermined operation to be performed by controlling the display control unit 2507, the communication control unit 2517, and the drive device 2513 in accordance with processing contents of the application program. Data under processing is mainly stored in the memory 2501, but may be stored in the HDD 2505. In the embodiments of the present disclosure, the application program for embodying the processing described above is distributed by being stored in the removable disk 2511 which is a computer readable disk and is installed into the HDD 2505 from the drive device 2513. The application program may be installed in the HDD 2505 via a network such as the Internet and the communication control unit 2517. In the computer device as described above, hardware such as the CPU 2503 and the memory 2501 and programs such as the OS and the application program described above are organically cooperated with each other and thereby various functions described above are realized.

Embodiments of the present disclosure described above may be outlined as follows.

The information processing device according to the embodiment of the present disclosure is an information processing device that controls an event occurring within a window extending over a first display surface and a second display surface in a multiple display system, and includes (A) a recording unit that records a first position at which a first event has occurred with a user's operation into the window in the first display surface, (B) a correlation unit that correlates in accordance with a certain condition an ID of the first event with an ID of a second event in a case where a second position at which the second event has occurred with a user's operation into the window in the second display surface is determined to be near the first position, and (C) a conversion unit that converts the ID of a third event into the ID of the first event in a case where an ID of a third event with a user's operation into the window in the second display surface coincides with the ID of the second event.

Accordingly, operations extending over display surfaces of a plurality of display devices may be handled as a series of operations.

The first position and the second position may be based on the window coordinate system.

Accordingly, processing which specifies the positional relationship is simplified.

A type of the first event may be a pointing end. A type of the second event may be a pointing start. In addition, a type of the third event may be a point movement.

Accordingly, slide operations extending over display surfaces of a plurality of display devices may be bandied as a series of slide operations.

The certain condition may include a condition that the first position is near a boundary to the second display surface and the second position is near a boundary to the first display surface.

Accordingly, a malfunction with respect to an operation not extending over display surfaces of a plurality of display devices may be avoided.

The correlation unit may be adapted to perform a correlation in a case where the second event relating to the second position which is near the first position occurs in a case where a predetermined period of time has not elapsed from an occurrence of the first event.

Accordingly, a malfunction with respect to operations which are not performed in series may be avoided.

A program causing a computer to perform processing of the information processing device described above is able to be prepared, and the program may be stored in, for example, a computer readable storage medium such as a flexible disk, a CD-ROM, a magneto optical disk, a semiconductor memory, and a hard disk, or a storage device. Furthermore, an intermediate processing result is in general saved in a storage device such as a main memory temporarily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first control device configured to control a first screen image in a multiple display system, the first control device being configured to cooperate with a second control device in the multiple display system, the first control device comprising:
   an interface configured to be coupled to the second control device, the second control device being configured to control a second screen image in the multiple display system, and the second screen image being adjacent position to the first screen image;
   a memory; and
   a processor coupled to the memory and the interface, the processor being configured to:
   execute a first process that includes
   receiving a first touch signal representing a first touch event from a first operating system in the first control device, the first touch signal including a first touch identifier, a first touch event information, and a first position information, the first position information indicating a first position of a first touch operation detected with respect to the first screen image, the first touch event information indicating at least whether the first touch operation corresponds to a first touch start, the first touch identifier being associated with a sequence of the first touch operation from the first touch start to a first touch end, storing the first touch signal in the memory, the first touch signal in the memory being associated with a first time stamp, transmitting the first touch signal to the second control device when a first condition is satisfied, the first condition being configured to be satisfied when the first touch operation indicated by the first touch signal corresponds to the first touch start and the first position of the first touch signal corresponds to a predetermined area in the first screen image, thereby the second control device determines whether there is a second touch operation adjacent to the first touch operation indicated by the first touch signal, the second touch operation being detected by the second control device with respect to the second screen image, and transmitting the first touch signal to a client terminal when the first condition is not satisfied, thereby the first touch signal associated with the first touch identifier is processed by an application software in the client terminal; and execute a second process that includes receiving a second touch signal representing a second touch event from the second control device, the second touch signal including a second touch identifier, a second touch event information, and a second position information, the second position information indicating a second position of the second touch operation detected with respect to the second screen image, the second touch event information indicating at least whether the second touch operation indicated by the second touch signal corresponds to a second touch start, the second touch identifier being associated with a sequence of the second touch operation from the second touch start to a second touch end, determining, when the second touch operation indicated by the second touch signal corresponds to the second touch start, whether a second condition is satisfied, the second condition being configured to be satisfied when there is the first touch operation adjacent to the second touch operation indicated by the second touch signal, the first touch operation being indicated by the first touch signal stored in the memory, storing a relation information in the memory when the second condition is satisfied, the relation information indicating a relation between the first touch identifier indicated by the first touch signal and the second touch identifier indicated by the second touch signal, transmitting, to the second control device, a first request including the second touch identifier when the second condition is satisfied, thereby the second control device is configured to transmit the second touch signal when the second control device detects the second touch operation associated with the second touch identifier indicated by the first request, generating the first touch signal from the second touch signal by converting the second touch identifier of the second signal into the first touch identifier associated with the second touch identifier in accordance with the relation information, and transmitting, to the client terminal, the first touch signal generated from the second touch signal, thereby the second touch signal is processed as the first touch signal associated with the first touch identifier by the application software in the client terminal.

2. The first control device according to claim 1, wherein the predetermined area in the first screen image includes a boundary to the second screen image.

3. The first control device according to claim 1, wherein the second condition is configured to be satisfied when a third condition and a fourth condition is satisfied, the third condition being configured to be satisfied when there is the first touch operation adjacent to the second touch operation indicated by the second touch signal, the fourth condition being configured to be satisfied when a time difference between a first time point and a second time point, the first time point being indicated by the time stamp associated with the first touch operation stored in the memory and a time point, the second time point being a time point when the second touch signal is received from the second control device.

4. The first control device according to claim 1, wherein the second process is configured to transmit, to the second control device, a second request including the second touch identifier when the second touch operation indicated by the received second touch signal corresponds to the second touch end, thereby the second control device is configured to stop a transmission of the second touch signal associated with the second touch identifier to the first control device at least until a third condition is satisfied, the third condition being configured to be satisfied when the second touch operation indicated by the second touch signal corresponds to the second touch start and a second position of the second touch signal corresponds to a predetermined area in the second screen image.

5. A control method performed by a first control device, the first control device being configured to control a first screen image in a multiple display system, the first control device being configured to cooperate with a second control device in the multiple display system, the second control device being configured to control a second screen image in the multiple display system, and the second screen image being adjacent position to the first screen image, the control method comprising:

executing a first process that includes receiving a first touch signal representing a first touch event from a first operating system in the first control device, the first touch signal including a first touch identifier, a first touch event information, and a first position information, the first position information indicating a first position of a first touch operation detected with respect to the first screen image, the first touch event information indicating at least whether the first touch operation corresponds to a first touch start, the first touch identifier being associated with a sequence of the first touch operation from the first touch start to a first touch end, storing, the first touch signal in a memory of the first control device, the first touch signal in the memory being associated with a first time stamp, transmitting the first touch signal to the second control device when a first condition is satisfied, the first condition being configured to be satisfied when the first touch operation indicated by the first touch signal corresponds to the first touch start and the first position of the first touch signal corresponds to a predetermined area in the first screen image, thereby the second control device determines whether there is a second touch operation adjacent to the first touch operation indicated by the first touch signal, the second touch operation being detected by the second control device with respect to the second screen image, and transmitting the first touch signal to a client terminal when the first condition is not satisfied, thereby the first touch signal associated with the first touch identifier is processed by an application software in the client terminal; and executing a second process that includes receiving a second touch signal representing a second touch event from the second control device, the second touch signal including a second touch identifier, a second touch event information, and a second position information, the second position information indicating a second position of the second touch operation detected with respect to the second screen image, the second touch event information indicating at least whether the second touch operation indicated by the second touch signal corresponds to a second touch start, the second touch identifier being associated with a sequence of the second touch operation from the second touch start to a second touch end, determining, when the second touch operation indicated by the second touch signal corresponds to the second touch start, whether a second condition is satisfied, the second condition being configured to be satisfied when there is the first touch operation adjacent to the second touch operation indicated by the second touch signal, the first touch operation being indicated by the first touch signal stored in the memory, storing a relation information in the memory when the second condition is satisfied, the relation information indicating a relation between the first touch identifier indicated by the first touch signal and the second touch identifier indicated by the second touch signal, transmitting, to the second control device, a first request including the second touch identifier when the second condition is satisfied, thereby the second control device is configured to transmit the second touch signal when the second control device detects the second touch operation associated with the second touch identifier indicated by the first request, generating the first touch signal from the second touch signal by converting the second touch identifier of the second signal into the first touch identifier associated with the second touch identifier in accordance with the relation information, and transmitting, to the client terminal, the first touch signal generated from the second touch signal, thereby the second touch signal is processed as the first touch signal associated with the first touch identifier by the application software in the client terminal.

6. A non-transitory computer readable storage medium that stores a program that causes a first control device to execute a process, first control device being configured to control a first screen image in a multiple display system, the first control device being configured to cooperate with a second control device in the multiple display system, the second control device being configured to control a second screen image in the multiple display system, and the second screen image being adjacent position to the first screen image, the process comprising:

executing a first process that includes receiving a first touch signal representing a first touch event from a first operating system in the first control device, the first touch signal including a first touch identifier, a first touch event information, and a first position information, the first position information indicating a first position of a first touch operation detected with respect to the first screen image, the first touch event information indicating at least whether the first touch operation corresponds to a first touch start, the first touch identifier being associated with a sequence of the first touch operation from the first touch start to a first touch end, storing the first touch signal in a memory of the first control device, the first touch signal in the memory being associated with a first time stamp, transmitting the first touch signal to the second control device when a first condition is satisfied, the first condition being configured to be satisfied when the first touch operation indicated by the first touch signal corresponds to the first touch start and the first position of the first touch signal corresponds to a predetermined area in the first screen image, thereby the second control device determines whether there is a second touch operation adjacent to the first touch operation indicated by the first touch signal, the second touch operation being detected by the second control device with respect to the second screen image, and transmitting the first touch signal to a client terminal when the first condition is not satisfied, thereby the first touch signal associated with the first touch identifier is processed by an application software in the client terminal; and executing a second process that includes receiving a second touch signal representing a second touch event from the second control device, the second touch signal including a second touch identifier, a second touch event information, and a second position information, the second position information indicating a second position of the second touch operation detected with respect to the second screen image, the second touch event information indicating at least whether the second touch operation indicated by the second touch signal corresponds to a second touch start, the second touch identifier being associated with a sequence of the second touch operation from the second touch start to a second touch end, determining, when the second touch operation indicated by the second touch signal corresponds to the second touch start, whether a second condition is satisfied, the second condition being configured to be satisfied when there is the first touch operation adjacent to the second touch operation indicated by the second touch signal, the first touch operation being indicated by the first touch signal stored in the memory, storing a relation information in the memory when the second condition is satisfied, the relation information indicating a relation between the first touch identifier indicated by the first touch signal and the second touch identifier indicated by the second touch signal, transmitting, to the second control device, a first request including the second touch identifier when the second condition is satisfied, thereby the second control device is configured to transmit the second touch signal when the second control device detects the second touch operation associated with the second touch identifier indicated by the first request, generating the first touch signal from the second touch signal by converting the second touch identifier of the second signal into the first touch identifier associated with the second touch identifier in accordance with the relation information, and transmitting, to the client terminal, the first touch signal generated from the second touch signal, thereby the second touch signal is processed as the first touch signal associated with the first touch identifier by the application software in the client terminal.

* * * * *